(12) United States Patent
Wang

(10) Patent No.: US 9,479,782 B2
(45) Date of Patent: Oct. 25, 2016

(54) SUPPLEMENTAL ENHANCEMENT INFORMATION MESSAGE CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 13/926,543

(22) Filed: Jun. 25, 2013

(65) Prior Publication Data

US 2014/0092994 A1 Apr. 3, 2014

Related U.S. Application Data

(60) Provisional application No. 61/707,759, filed on Sep. 28, 2012.

(51) Int. Cl.
| | |
|---|---|
| *H04N 7/12* | (2006.01) |
| *H04N 19/70* | (2014.01) |
| *H04N 19/00* | (2014.01) |
| *H04N 19/40* | (2014.01) |
| *H04N 19/61* | (2014.01) |
| *H04N 19/176* | (2014.01) |
| *H04N 19/46* | (2014.01) |
| *H04N 19/65* | (2014.01) |
| *H04N 7/68* | (2006.01) |

(52) U.S. Cl.
CPC .... *H04N 19/00884* (2013.01); *H04N 7/26244* (2013.01); *H04N 7/26335* (2013.01); *H04N 7/26941* (2013.01); *H04N 7/50* (2013.01); *H04N 19/46* (2014.11); *H04N 19/65* (2014.11); *H04N 19/70* (2014.11); *H04N 7/68* (2013.01)

(58) Field of Classification Search
CPC .............. H04N 7/50; H04N 7/26244; H04N 7/26335; H04N 7/26941; H04N 7/68
See application file for complete search history.

(56) References Cited

U.S. PATENT DOCUMENTS

| | | |
|---|---|---|
| 8,249,112 B2 | 8/2012 | Wiegand |
| 8,275,051 B2 | 9/2012 | Hannuksela et al. |
| 2003/0112867 A1 | 6/2003 | Hannuksela et al. |

(Continued)

FOREIGN PATENT DOCUMENTS

| | | |
|---|---|---|
| TW | 201023653 A | 6/2010 |
| WO | 2006134110 A1 | 12/2006 |
| WO | 2007115129 | 10/2007 |

OTHER PUBLICATIONS

Schierl, et al., "AHG9: Slice Prefix for sub-picture and slice level HLS signalling", JCT-VC Meeting; MPEG Meeting; Jul. 11, 2012-Jul. 20, 2012; Stockholm; (Joint Collaborative Team on Video Coding of ISO/IEC (JTC1/SC29/WG11 and ITU-T SG.16); URL: http://wftp3.1tu.int/av-arch/jctvc-site/ No. JCTVC-J0255, XP030112617, 12 pp.*

(Continued)

*Primary Examiner* — Shawn An
(74) *Attorney, Agent, or Firm* — Shumaker & Sieffert, P.A.

(57) ABSTRACT

Techniques are described for signaling decoding unit identifiers for decoding units of an access unit. The video decoder determines which network abstraction layer (NAL) units are associated with which decoding units based on the decoding unit identifiers. Techniques are also described for including one or more copies of supplemental enhancement information (SEI) messages in an access unit.

20 Claims, 6 Drawing Sheets

(56) References Cited

U.S. PATENT DOCUMENTS

| | | | |
|---|---|---|---|
| 2005/0201471 | A1 | 9/2005 | Hannuksela et al. |
| 2007/0230564 | A1 | 10/2007 | Chen et al. |
| 2008/0019446 | A1* | 1/2008 | Hannuksela ............. 375/240.16 |
| 2008/0291999 | A1 | 11/2008 | Lerouge et al. |
| 2010/0020871 | A1 | 1/2010 | Hannuksela et al. |
| 2010/0153395 | A1* | 6/2010 | Hannuksela ......... G11B 27/102 707/737 |
| 2011/0110436 | A1 | 5/2011 | Schierl et al. |
| 2012/0230429 | A1* | 9/2012 | Boyce et al. ............ 375/240.25 |
| 2012/0236115 | A1 | 9/2012 | Zhang et al. |
| 2014/0092993 | A1 | 4/2014 | Wang |
| 2015/0208095 | A1 | 7/2015 | Schierl et al. |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27,-May 7, 2012, JCTVC-I1003_d2, 290 pp.

Bross, et al., "High Efficiency Video Coding (HEVC) text specification draft 8", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/" No. JCTVC-J1003_d7, XP030112947, 261 pp.

Second Written Opinion from International Application No. PCT/US2013/055865, dated Sep. 23, 2014, 7 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Hannuksela: "Signaling of Timestamps", JVT Meeting; MPEG Meeting; Jun. 5, 2002-Oct. 5, 2002; Fairfax, US; (Joint Video Team of ISO/IEC TC1/SC29/VVG11 and ITU-T SG.16 ) No. JVT-0070, XP030005179, ISSN: 0000-0442, 10 pp.

International Search Report and Written Opinion—PCT/US2013/055865—ISA/EPO—Nov. 14, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Nakagami, et al., "AHG9: On column_width_minus1 syntax", JCT-VC Meeting; MPEG Meeting; Jan. 1, 2013-Jan. 23, 2013; Geneva; (Joint Collaborative Team on Video Coding of ISO/IEC JTC1/SC29IWG11 and ITU-T SG.16 ); URL: http://wftp3.itu.int/av-arch/jctvc-site/ No. JCTVC-L0155, XP030113643, 2 pp.

Schierl, et al., "AHG9: Slice Prefix for sub-picture and slice level HLS signalling", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/ No. JCTVC-J0255, XP030112617, 12 pp.

Wenger "H.264/AVC over IP", IEEE Transactions on Circuits and Systems for Video Technology, I EEE Service Center, Piscataway, NJ, US, vol. 13, No. 7, Jul. 1, 2003, XP011099257, ISSN: 1051-8215, DOI: 10.1109/TCSVT.2003.814966, pp. 645-656.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wang "AHG9: On HRD and related general issues", MPEG Meeting; Oct. 15, 2012-Oct. 19, 2012; Shanghai; (Motion Picture Expert Group or ISO/IEC JTC1/SC29/VVG11)" No. m26418, XP030054751, 8 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

International Preliminary Report on Patentability from International Application No. PCT/US2013/055865, dated Jan. 28, 2015, 10 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

* cited by examiner

SUPPLEMENTAL ENHANCEMENT INFORMATION MESSAGE CODING

This application claims the benefit of U.S. Provisional Application No. 61/707,759, filed Sep. 28, 2012, the entire content of which is incorporated by reference herein.

TECHNICAL FIELD

This disclosure generally relates to processing video data and, more particularly, techniques applicable to one or more video coding standards.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, proprietary standards, open video compression formats such as VP8, and extensions of such standards, techniques or formats. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for processing decoding units within an access unit. An access unit refers to the video data of one or more pictures within the same time instance. For example, the decoding of an access units results in one or more decoded pictures, where all of the decoded pictures are for the same time instance.

An access unit includes one or more decoding units. As described in more detail, in some examples, the techniques described in this disclosure uniquely identify each of the decoding units within the access unit. In some examples, the techniques allow for one or more copies of a message to be embedded within the access unit.

In one example, the disclosure describes a method for decoding video data. The method comprising decoding a unique identifier for each decoding unit in an access unit. In this example, an identifier for one decoding unit is different than an identifier for any other decoding unit in the access unit. The method also includes determining which network access layer (NAL) units are associated with which decoding units based on the unique identifier for each decoding unit in the access unit, and decoding the NAL units of each of the decoding units in the access unit, based on the determination, to reconstruct at least one picture.

In another example, the disclosure describes a method for encoding video data. The method comprising determining a unique identifier for each decoding unit in an access unit. In this example, an identifier for one decoding unit is different than an identifier for any other decoding unit in the access unit. The method also includes determining which network access layer (NAL) units are associated with which decoding units of the access unit, and generating for output each unique identifier in corresponding decoding units to indicate which NAL units are associated with which decoding units of the access unit.

In another example, the disclosure describes a device for decoding video data. The device comprises a video decoder configured to decode a unique identifier for each decoding unit in an access unit. In this example, an identifier for one decoding unit is different than an identifier for any other decoding unit in the access unit. The video decoder is configured to determine which network access layer (NAL) units are associated with which decoding units based on the unique identifier for each decoding unit in the access unit, and decode the NAL units of each of the decoding units in the access unit, based on the determination, to reconstruct at least one picture.

In another example, the disclosure describes a device for encoding video data. The device comprises a video encoder configured to determine a unique identifier for each decoding unit in an access unit. In this example, an identifier for one decoding unit is different than an identifier for any other decoding unit in the access unit. The video encoder is configured to determine which network access layer (NAL) units are associated with which decoding units of the access unit, and generate for output each unique identifier in corresponding decoding units to indicate which NAL units are associated with which decoding units of the access unit.

In another example, the disclosure describes a computer-readable storage medium having instructions stored thereon that when executed cause one or more processors of a device for decoding video data to decode a unique identifier for each decoding unit in an access unit, wherein an identifier for one decoding unit is different than an identifier for any other decoding unit in the access unit, determine which network access layer (NAL) units are associated with which decoding units based on the unique identifier for each decoding unit in the access unit, and decode the NAL units of each of the decoding units in the access unit, based on the determination, to reconstruct at least one picture.

In another example, the disclosure describes a device for decoding video data, the device comprising means for decoding a unique identifier for each decoding unit in an access unit, wherein an identifier for one decoding unit is different than an identifier for any other decoding unit in the access unit, means for determining which network access layer (NAL) units are associated with which decoding units based on the unique identifier for each decoding unit in the access unit, and means for decoding the NAL units of each of the decoding units in the access unit, based on the determination, to reconstruct at least one picture.

In another example, the disclosure describes a method for coding video data, the method comprising coding a supplemental enhancement information (SEI) message in an access unit. In this example, the access unit includes the video data for reconstructing at least one picture, and the SEI message defines a characteristic of the video data. The method also includes coding a copy of the SEI message in the access unit.

In another example, the disclosure describes a device for coding video data, the device comprising a video coder configured to code a supplemental enhancement information (SEI) message in an access unit. In this example, the access unit includes the video data for reconstructing at least one picture, and the SEI message defines a characteristic of the video data. The video coder is also configured to code a copy of the SEI message in the access unit.

In another example, the disclosure describes a computer-readable storage medium having instructions stored thereon that when executed by one or more processors of a device for coding video data cause the one or more processors to code a supplemental enhancement information (SEI) message in an access unit. In this example, the access unit includes the video data for reconstructing at least one picture, and the SEI message defines a characteristic of the video data. The instructions also cause the one or more processors to code a copy of the SEI message in the access unit.

In another example, the disclosure describes a device for coding video data, the device comprising means for coding a supplemental enhancement information (SEI) message in an access unit. In this example, the access unit includes the video data for reconstructing at least one picture, and the SEI message defines a characteristic of the video data. The device also includes means for coding a copy of the SEI message in the access unit.

The details of one or more examples are set forth in the accompanying drawings and the description below. Other features, objects, and advantages will be apparent from the description and drawings, and from the claims.

DETAILED DESCRIPTION

Figure 1:
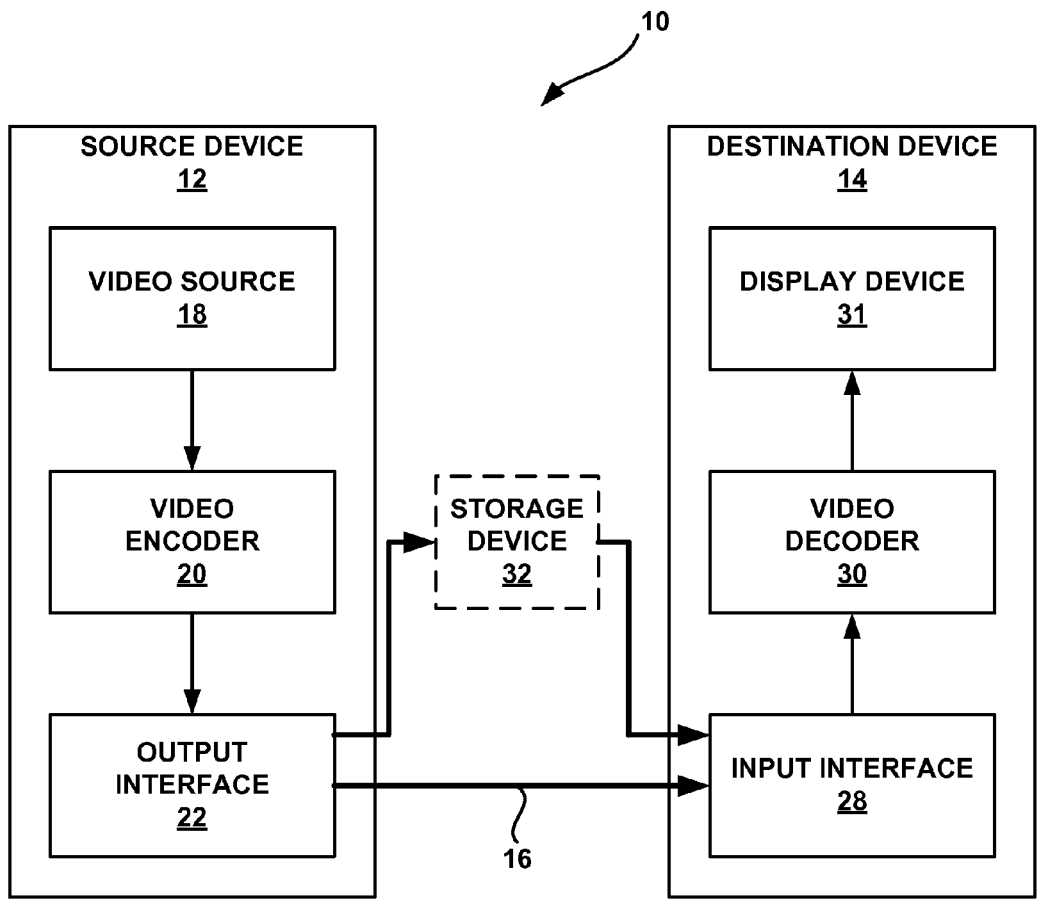
FIG. 1 is a block diagram illustrating an example video encoding and decoding system that may utilize the techniques described in this disclosure.

This disclosure describes various methods for error resilient decoding unit signaling and association in video coding. In multi-view coding or scalable video coding, multiple pictures or layers may be coded for a given time instance. Pictures of the same time instance are coded in a single access unit (AU). For example, the decoding of an access unit results one picture for when multi-view coding is not used or a plurality of pictures of the same time instance for multi-view coding.

A decoding unit (DU) generally refers to a subset of an access unit or the entirety of the access unit. For example, if operation at a sub-picture level is allowed, then a decoding unit is a subset of the access unit, and the access unit includes a plurality of decoding units. Because an access unit includes video data for one or more pictures, operation at the decoding unit level can be considered as operation at a sub-picture level. If operation at the sub-picture level is not allowed, then a decoding unit is the entirety of the access unit.

A decoding unit includes one or more network abstraction layer (NAL) units. For example, a decoding unit includes one or more video coding layer (VCL) NAL units and the associated non-VCL NAL units. One example of a NAL unit is a slice of a picture (i.e., the data encapsulated in the NAL unit includes the video data needed to decode a slice of a picture). Another example of a NAL unit is a parameter set. For example, a NAL unit may include video data of a picture parameter set, a sequence parameter set, and other examples of a parameter set. As yet another example, a NAL unit may include additional information such as supplemental enhancement information (SEI) messages used for purposes of determining processing and removal times of the decoding units from a buffer (e.g., a coded picture buffer).

In some examples described in this disclosure, the video encoder generates for output and outputs (e.g., signals), in a coded bitstream, an identifier for each decoding unit within the access unit. Each identifier (referred to as DU identifiers) uniquely identifies a decoding unit within the access unit. The video decoder receives, from the coded bitstream, the identifiers for the decoding units within the access unit. The video decoder determines which NAL units are associated with which decoding units based on the decoding unit identifiers.

In this manner, the techniques described in this disclosure may ensure that NAL units are associated with the correct decoding units. For instance, it is possible for the video encoder to signal information (e.g., output information) that indicates the number of NAL units each decoding unit includes. Rather than utilizing decoding unit identifiers, the video decoder, may determine the association of the NAL units to decoding units based on the order in which the video decoder received the NAL units and the signaled information indicating the number of NAL units that each decoding unit includes.

However, in this case, ensuring that the NAL units are associated with the correct decoding units is not error resilient. For example, if a NAL unit is lost during transmission (e.g., from the video encoder to the video decoder, from the video encoder to an intermediate storage device, or from the intermediate storage device to the video decoder), the video decoder may not be able to determine which NAL units are associated with which decoding units.

As another example of possible issues with ensuring NAL units are associated with the correct decoding units, it may be possible for the video encoder to signal the NAL units associated with a decoding unit between two types of messages. For instance, the video encoder may signal a first instance of a particular type of a supplemental enhancement information (SEI) message, followed by one or more NAL units for a first decoding unit, followed by a second instance of the particular type of SEI message, followed by one or more NAL units of a second decoding unit, and so forth. The video decoder may determine that every NAL unit received after the first instance of this type of SEI message and before the second instance of this type of SEI message is associated with the first decoding unit, every NAL unit received after the second instance of this type of SEI message and before the third instance of this type of SEI message is associated with the second decoding unit, and so forth.

This type of SEI message may include additional information pertinent to proper timing of the encoding and decoding. However, because the positions of this type of SEI messages indicate which NAL units are associated with which decoding units, it may not be possible for the video encoder to include multiple copies of this type of SEI message within the decoding unit. Therefore, even if one of these SEI messages is lost in transmission, the video decoder may not be able to determine which NAL units are associated with which decoding units, and may not be able to determine the additional information carried by the lost SEI message.

In the techniques described in this disclosure, the video encoder may generate for output and output information (e.g., with decoding unit identifiers in an SEI message or slice header) that indicates which NAL units are associated with which decoding units. In this way, even if a NAL unit is lost in transmission, the video decoder may be able to determine which NAL units are associated with which decoding units. Also, because the video decoder may not need to rely on the positions of the SEI messages to determine which NAL units are associated with which decoding units, the video encoder can generate for output and output one or more copies of the SEI message in the decoding unit. Such techniques may provide for a comparatively more error resilient manner in which the video decoder determines which NAL units are associated with which decoding units as compared to some other techniques described above.

Moreover, in some of the other techniques described above, SEI messages of a certain type are prohibited to be repeated (an issue that the techniques described in this disclosure may address). In some cases, in these other techniques, not only are certain SEI message types prohibited from being repeated, but SEI messages in general are restricted from being repeated in the access unit after the first VCL NAL unit in the access unit and before the last NAL unit in the access unit.

For example, in some of these other techniques, a video decoder would determine the beginning of an access unit based on the location of the SEI messages. For instance, the SEI messages would be located at beginning of the access unit, and after determining that the video decoder is processing an SEI message, the video decoder would determine that the video decoder is processing a new access unit. Accordingly, there is a restriction of including multiple copies of SEI messages within the same access unit.

In an error-prone environment, it may be beneficial to include copies of the SEI messages so that if the SEI message is lost, other copies of the SEI message are available. In some examples, the techniques allow for various types of SEI messages to be repeated within the access unit, which further allows for error resiliency. As one example, the techniques may specify the following for all SEI messages: (1) an application scope that the information carried in an SEI message applies to; (2) where an SEI message can be present; and (3) a restriction on the contents of multiple instances of a particular type of SEI message.

For example, the access unit may be packetized into a plurality of packets (e.g., a real-time transport protocol (RTP) packet). Each packet typically includes one or more NAL units, but in some cases, a packet may include a subset of a NAL unit. In an error-prone environment, one or more packets may be lost, and if the lost packets included an SEI message, the SEI message may be lost. In the techniques described in this disclosure, the video encoder may generate for output and output (e.g., signal) one or more copies of the SEI message in the access unit. In this way, even if a packet that includes one of the SEI messages is lost, the SEI message may still be available as a copy in a packet that is not lost.

As another example, the video encoder may encode a video bitstream with multiple layers, such as in the multi-layer extension of high efficient video coding (HEVC) standard. The multiple layers include a base layer and one or more non-base layers. A non-base layer may be a spatial or quality enhancement layer, texture of a different view, depth of a different view, and other such examples. The video encoder may transport the different layers in different channels (e.g., using multi-session transmission (MST) similarly defined in IETF RFC 6190 (publically available in http://tools.ietf.org/rfc/rfc6190.txt). In the techniques described in this disclosure, the video encoder may include an SEI NAL unit within two VCL NALU units within an access unit, where the SEI NAL unit includes the SEI messages, and after the first VCL NAL unit of the access unit. In other words, the techniques described in this disclosure for including SEI message after the first VCL NAL unit in an access unit are also applicable to examples of multi-session transmission.

In the techniques described in this disclosure, the video decoder need not necessarily rely on the location of SEI messages to determine that the video decoder is processing a new access unit. For example, the video decoder may rely on some other header information to determine that a new access unit is being processed. Accordingly, in the techniques described this disclosure, the video encoder may generate for output and output an SEI message in the access unit and one or more copies of the SEI message in the access unit, and the video decoder may receive the SEI message and one or more copies of the SEI message. Because the video decoder does not need to rely on the SEI message to determine when a new access unit is being processed, the video decoder may be configured to process multiple copies of SEI messages within the same access unit without determining that a new, different access unit is being processed.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may be formed as individual microprocessors or integrated circuits (ICs) or may be part of larger microprocessors or ICs. In some examples, video encoder 20 and video decoder 30 may be part of a wireless communication device.

Video encoder 20 and video decoder 30 may operate according to a video compression standard. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC) including its scalable video coding (SVC) and multiview video coding (MVC) extensions.

In addition, there is a new video coding standard that video encoder 20 and video decoder 30 may operate in accordance with, namely High Efficiency Video Coding (HEVC) standard being developed by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may conform to the HEVC Test Model (HM). A recent draft of the HEVC standard, referred to as "HEVC Working Draft 8" or "WD8," is described in document JCTVC-H1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, S E, Jul. 11-20, 2012, which, as of Apr. 2, 2013, is downloadable from http://phenix.int-evry.fr/jct/doc_end_user/documents/10_Stockholm/wg11/JCTVC-J1003-v8.zip, the entire content of which is incorporated herein by reference. A more recent working draft of HEVC, and referred to as "HEVC Working Draft 9" or "WD9" hereinafter, is available, as of Apr. 2, 2013, from http://phenix.int-evry.fr/jct/doc_en-d_user/documents/11_Shanghai/wg11/JCTVC-K1003-v10.zip.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263, as well as open formats such as VP8.

The techniques of this disclosure, however, are not limited to any particular coding standard. For example, video encoder 20 and video decoder 30 need not necessarily conform to any particular video coding standard. Moreover, even if the techniques described in this disclosure may not necessarily conform to a particular standard, the techniques described in this disclosure may further assist in coding efficiency relative to the various standards. Also the techniques described in this disclosure may be part of future standards. For ease of understanding, the techniques are described with respect to the HEVC standard under development, but the techniques are not limited to the HEVC standard, and can be extended to other video coding standards or video coding techniques that are not defined by a particular standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, individual or part of an integrated circuit (IC), software, hardware, firmware or any combinations thereof. When the techniques are implemented partially in software, a device may store instructions for the software in a suitable, non-transitory computer-readable storage medium and execute the instructions in hardware using one or more processors to perform the techniques of this disclosure. In other words, when implemented partially in software, the software executed on underlying hardware components that cause the hardware components to implement certain functions. Each of video encoder 20 and video decoder 30 may be included in one or more encoders or decoders, either of which may be integrated as part of a combined encoder/decoder (CODEC) in a respective device.

For example, video encoder 20 and video decoder 30 may be included in a wireless device such as source device 12 and destination device 14, respectively. As another example, a device may include a microprocessor or an integrated circuit. In some examples, a device, such as the microprocessor or the integrated circuit, may include video decoder 30, and another device may include video encoder 20.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC.

In general, the working model of the HM describes that a video frame or picture may be divided into a sequence of treeblocks or largest coding units (LCU) that include both luma and chroma samples. A treeblock may serve some similar purposes as a macroblock of the H.264 standard, although a treeblock has many differences relative to a macroblock. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded (i.e., intra-prediction encoded), the PU may include data describing an intra-prediction mode for the PU. As another example, when the PU is inter-mode encoded (i.e., inter-prediction encoded), the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPiclList0 or RefPicList1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan or may select a scan from a plurality of possible scans. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 generates video data that defines the manner in which the pictures are to be reconstructed by video decoder 30, encodes the video data (e.g., generates for output), and outputs (e.g., signals) the video data to video decoder 30 in a coded bitstream. Video decoder 30 receives the encoded video data from the coded bitstream, decodes the video data, and processes the video data to reconstruct the pictures. In general, video decoder 30 implements the reciprocal of the techniques video encoder 20 implemented to encode and generate the video data.

For example, video decoder 30 decodes the video data using a reciprocal technique to the manner in which video encoder 20 encoded the video data. Also, video decoder 30 intra-prediction decodes or inter-prediction decodes the pictures to reconstruct the pictures. For instance, video decoder 30 processes the video data to determine a previously decoded picture that is used for inter-prediction decoding, and to determine the residual between the previously decoded picture and the current picture for inter-prediction decoding. Video decoder 30 adds the residual to the previously decoded picture to reconstruct the current picture. Similarly, video decoder 30 processes the video data to determine a previously decoded block within the current picture, and to determine the residual between the previously decoded block within the current picture and the current block within the current picture for intra-prediction decoding. Video decoder 30 adds the residual to the previously decoded block to reconstruct the current block of the current picture.

In this way, video encoder 20 outputs video data that video decoder 30 utilizes to reconstruct the pictures. In some examples, video encoder 20 outputs the video data in access units. An access unit is a conceptual unit that includes the video data for one or more pictures within the same time instance. For example, in scalable video coding, video encoder 20 generates video data at multiple layers for a picture. In this example, the access unit for the picture includes video data for all of the multiple layers.

As another example, in multiview video coding, video encoder 20 generates video data for multiple views, where each view includes multiple pictures. In multiview video coding, one picture in each view is displayed at the same time instance. For example, the first picture in the first view is displayed at the same time instance as the first picture in the second view, the first picture in the third view, and so forth. In this example, one access unit includes the video data for all pictures that are displayed at the same time instance. In examples in which scalable video coding or multiview video coding are not used, one access unit includes the video data for one picture.

Accordingly, in general, the decoding and processing of one access unit by video decoder 30 results in one or more pictures. If the decoding and processing of one access unit by video decoder 30 results in one picture, then the video data of the access unit may include information for all layers of the picture if scalable video coding is utilized or include information for only one layer if scalable video coding is not utilized. If the decoding and processing of one access unit by video decoder 30 results in multiple pictures, the video data of the access unit may include information for all pictures in the same time instance for multiview video coding.

An access unit includes one or more decoding units. For example, as described above, the access unit may include video data for an entire picture. If operation on a sub-picture level is not allowed, then the access unit includes only one decoding unit. If operation on a sub-picture level is allowed, then the access unit includes one or more decoding units.

For example, video decoder 30 includes a coded picture buffer (CPB) and a decoded picture buffer (DPB). The CPB stores video data received from the coded bitstream and the DPB stores reconstructed pictures. As described in more detail, video encoder 20 generates and outputs information that describes the behavior of the CPB, such as information that indicates when decoding units or access units are to be removed from the CPB. In some examples, video encoder 20 encodes and outputs a syntax element (e.g., a flag referred to as the SubPicCpbFlag) that indicates whether operation at a sub-picture level for an access units is allowed (e.g., for each of the decoding units within the access unit).

If video decoder 30 determines that SubPicCpbFlag is 0, then video decoder 30 may determine that operation of the access unit is not allowed at a sub-picture level, and may also determine that the access unit includes one decoding unit. In other words, when SubPicCpbFlag is 0, the decoding unit and the access unit are the same. If video decoder 30 determines that SubPicCpbFlag is 1, then video decoder 30 may determine that operation of the access unit is allowed at a sub-picture level, and may also determine that the access unit includes one or more decoding units.

A decoding unit includes one or more network abstraction layer (NAL) units. A NAL unit is a syntax structure that contains an indication of the type of video data to follow and bytes containing that video data. Examples of a NAL unit include a video coding layer (VCL) NAL unit and a non-VCL NAL unit. As an example, VCL NAL units may include video data for slices within a picture (e.g., information such as reference picture list indices, motion vectors, intra-prediction modes, etc. needed to predict the slices) or NAL units of a particular NAL unit type. As an example, non-VCL NAL units may include video data such as information of a parameter set (e.g., picture parameter set, sequence parameter set, etc.) or supplemental information for assisting with video encoding or video decoding.

In this disclosure, a decoding unit including one or more NAL units may be considered as one or more NAL units being associated with or assigned to a decoding unit. In other words, one or more NAL units being associated with or assigned to a decoding unit may be considered to be the same as a decoding unit including these one or more NAL units.

Accordingly, the techniques described in this disclosure may utilize the following terms with the following definitions.

decoding unit: An access unit when SubPicCpbFlag is equal to 0 or a subset of an access unit when SubPicCpbFlag is equal to 1, consisting of one or more VCL NAL units in an access unit and the associated non-VCLA NAL units.

associated non-VCL NAL unit: An associated non-VCL NAL unit of a VCL NAL unit is one of the non-VCL NAL units for which the VCL NAL Unit is their associated VCL NAL unit. In other words, a non-VCL NAL unit is associated with a VCL NAL unit, and that VCL NAL unit can be considered as being associated with the non-VCL NAL unit (e.g., the association between VLC NAL unit and non-VCL NAL unit goes both ways).

associated VLC NAL unit: The most recent preceding VCL NAL unit in decoding order for non-VCL NAL units with nal_unit_type equal to UNSPEC0, EOS_NUT, EOB_NUT, FD_NUT, in the range of RSV_NVCL44 . . . RSV_NVCL47, or in the range of UNSPEC48 . . . UNSPEC63, or the first subsequent VCL NAL unit in decoding order for non-VCL NAL units with nal_unit_type equal to other values.

As described above, in some examples, video encoder 20 encodes and outputs NAL units that include supplemental information for assisting with video encoding or video decoding. This supplemental information is not necessary for video encoder 20 and video decoder 30 to conform to the requirements of a video coding standard such as the HEVC video coding standard. Accordingly, the inclusion of the supplemental information is optional, but may be preferable as such information assists with increasing the efficiency of the video encoding and video decoding.

One example of NAL units that include such supplemental information is supplemental enhancement information (SEI) NAL units. The usage of SEI NAL units enables video encoder 20 to include such metadata in the coded bitstream that is not required for correct decoding of the output pictures, but can be used for various other purposes, such as picture output timing, displaying, as well as loss detection and concealment (e.g., to assist with encoding and decoding). Video encoder 20 may be configured to include any number of SEI NAL units in an access unit, and each SEI NAL unit may include one or more SEI messages.

The HEVC standard includes the syntax and semantics for several SEI messages, but the handling of the SEI messages is not specified because these SEI messages generally do not affect the normative decoding process. One of the reasons to include SEI messages in the HEVC standard is to ensure that various types of video decoders (one example of which is video decoder 30) interpret the SEI messages identically in different systems that conform to the HEVC standard. Accordingly, specifications or systems that conform to the HEVC standard may require video encoders (such as video encoder 20) to generate certain SEI messages or may define specific handling of particular types of received SEI messages by video decoders (such as video decoder 30).

The following Table 1 lists the SEI message specified in HEVC and briefly describes their purpose. It should be understood that the SEI messages are described with respect to the HEVC standard for purposes of illustration only. Other video coding standards, including proprietary video coding standards, may include similar or different SEI messages than those described in Table 1 or otherwise described below. Furthermore, even non-standards based video coding techniques may rely upon SEI messages similar or different than those described in Table 1 or otherwise described below. The techniques described in this disclosure may be applicable to all such cases.

In general, SEI messages may be considered as defining characteristics of the video data. For example, the buffering period and picture timing SEI messages define video data characteristics such as initial delays and picture output time or picture/sub-picture removal time. As additional examples, the purpose of the SEI messages in Table 1 provides examples of characteristics of the video data that are defined by corresponding SEI messages.

TABLE 1

Overview of SEI Messages

| SEI message | Purpose |
| --- | --- |
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |

TABLE 1-continued

Overview of SEI Messages

| SEI message | Purpose |
| --- | --- |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Field indication | Provides information related to interlaced video content and/or field coding, e.g. indicates whether the picture is a progressive frame, a field, or a frame containing two interleaved fields |
| Decoded picture hash | Checksum of the decoded picture, which may be used for error detection |
| Sub-picture timing | Sub-picture removal time for HRD operation |
| Active parameter sets | Provides information on active VPS, SPS, etc. |
| Structure of Pictures description | Describes the temporal and inter prediction structure of the bitstream |

In some examples, video encoder 20 may be configured to limit where the SEI messages are located within the access unit. For instance, among the SEI messages, the sub-picture timing SEI message may follow, in decoding order, the first VCL NAL unit in the access unit containing the SEI message, but may not follow, in decoding order, the last VCL NAL unit in the access unit. All the other SEI messages may precede the first VCL NAL unit in the access unit when nuh_reserved_zero_6bits is equal to 0 for the SEI NAL unit containing the SEI message.

The nuh_reserved_zero_6bits syntax element identifies a layer in scalable video coding or a view in multiview video coding. For example, the nuh_reserved_zero_6bits syntax element is 0 for the base layer in scalable video coder or 0 for the base view in multiview video coding. The nuh_reserved_zero_6bits syntax element for the other layers or views is a positive integer value used to identify the layer or view. In cases where scalable video coding or multiview video coding is not used, nuh_reserved_zero_6bits is assumed to be 0.

As indicated in Table 1, various SEI messages, such as the buffering period SEI message, picture timing SEI message, and sub-picture timing SEI message define delays and removal times in a hypothetical reference decoder (HRD). The HRD is a model used to define the characteristics of the coded picture buffer (CPB) and the decoded picture buffer (DPB). As described above, the CPB stores video data from the bitstream such as the encoded pictures, prior to the decoding, and the DPB stores decoded video data including decoded pictures.

In general, each video coding standard includes a specification for video buffering model. In AVC and HEVC, the buffering model is referred to as hypothetical reference decoder (HRD), which includes a buffering model of both the coded picture buffer (CPB) and the decoded picture buffer (DPB), and the CPB and DPB behaviors are mathematically specified. The HRD may directly impose constraints on different timing, buffer sizes and bit rate, and indirectly impose constraints on bitstream characteristics and statistics. A complete set of HRD parameters include five basic parameters: initial CPB removal delay, CPB size, bit rate, initial DPB output delay, and DPB size.

In AVC and HEVC, bitstream conformance and decoder conformance are specified as parts of the HRD specification. It should be understood that although the HRD is labeled as a type of a decoder, the HRD is typically needed at the video encoder 20 side to guarantee bitstream conformance. The HRD may not be needed at the video decoder 30 side. For example, video encoder 20 may signal the timing information and other characteristics of the CPB and DPB as SEI messages, and video decoder 30 may determine the timing and characteristics of the CPB and DPB based on the signaled SEI messages. For example, the SEI messages may specify two types of bitstream or HRD conformance, namely Type I and Type II. Also, the SEI messages may specify two types of video decoder 30 conformance: output timing decoder conformance and output order decoder conformance.

In the techniques described in this disclosure, video encoder 20 may specify whether the CPB of video decoder 30 can operate at either the access unit level or the sub-access unit level (also referred to as sub-picture level). As described above, video encoder 20 encodes and outputs (e.g., signals) a syntax element (e.g., the SubPicCpbFlag). If the value of SubPicCpbFlag is 0, then CPB operation on a sub-picture level is not allowed. If the value of SubPicCpbFlag is 1, then CPB operation on a sub-picture level is allowed.

The SEI messages may provide information regarding the decoding units within an access unit. For example, the picture timing SEI message (PT SEI message) includes the num_nalus_in_du_minus1[i] syntax elements. The num_nalus_in_du_minus1[i] syntax element plus one indicates the number of NAL units within the ith decoding unit.

In some cases, video decoder 30 may utilize the information from the num_nalus_in_du_minus1[i] syntax elements, outputted by video encoder 20, to determine which NAL units are associated/assigned to which decoding units. As an illustrative example, assume that the num_nalus_in_du_minus1[i] syntax elements indicate that the first decoding unit, of an access unit, is associated with three NAL units, the second decoding unit, of the access unit, is associated with two NAL units, and the third decoding unit, of the access unit, is associated with two NAL units.

In this example, video decoder 30 determines which NAL units are associated with which decoding units based on the order in which the CPB receives the NAL units. For instance, video decoder 30 determines that the first three NAL units that the CPB receives are associated with the first decoding unit, the next two NAL units that the CPB receives are associated with the second decoding unit, and the next two NAL units that the CPB receives are associated with the third decoding unit.

However, video decoder 30 determining which NAL units are associated with which decoding units based on syntax elements indicating the number of NAL units that are associated with each decoding unit is not error resilient. In an error-prone or lossy communication link, one or more of the NAL units may be lost. For example, if link 16 is error-prone or lossy, then one or more of the NAL units may be lost. As another example, if the link from output interface 22 to storage device 32 or the link from output interface 32 to input interface 28 is error-prone or lossy, then one or more of the NAL units may be lost.

When a NAL unit is lost, video decoder 30 may not be able to correctly determine which NAL units are associated with which decoding units, unless the exact position and number of losses of consecutive NAL units are known (which video decoder 30 may not be able to determine). For example, assume that in the previous example, the second NAL unit is lost. In this case, video decoder 30 determines that the first three received NAL units are for first decoding unit because the num_nalus_in_du_minus1[i] syntax element indicated that the first decoding unit includes three NAL units. However, video encoder 20 associated the third received NAL unit, in this case, with the second decoding unit (again, the second NAL unit is lost). Therefore, video decoder 30 incorrectly associated the third received NAL unit with the first decoding unit when video decoder 30 should have associated the third received NAL unit with the second decoding unit.

In some examples, in addition to or instead of, the num_nalus_in_du_minus1[i] syntax elements, video decoder 30 may determine which NAL units are associated with which decoding units based on the positions of the SEI messages. As one example, video encoder 20 may utilize the positions of the sub-picture timing (SPT) SEI messages, within the access unit, to indicate which NAL units are associated with which decoding units, and video decoder 30 may utilize the positions of the sub-picture timing SPT SEI messages, within the access unit, to determine which NAL units are associated with which decoding units.

For example, the SPT SEI message is part of an SEI NAL unit that is associated with a decoding unit. The SPT SEI message may provide information indicating when a decoding unit is to be removed from the CPB. In some examples, all the NAL units that follow the SEI NAL unit that do not include the SPT SEI message until the next SPT SEI message are considered associated with the decoding unit. In other words, the NAL units sandwiched between a first SPT SEI message and a second SPT SEI message, and the SEI NAL unit that includes the first SPT SEI message are all considered to be associated with a decoding unit.

In this way, after the CPB of video decoder 30 receives a first SEI NAL unit with a first SPT SEI message, video decoder 30 may determine that the first SEI NAL unit and all NAL units until the next SEI NAL unit with the next SPT SEI message (i.e., the second SEI NAL unit with the second SPT SEI message) are associated with the first decoding unit. Video decoder 30 may also determine that the second SEI NAL unit and all NAL units until the next SEI NAL unit with the next SPT SEI message (i.e., the third SEI NAL unit with the third SPT SEI message) are associated with the second decoding unit, and so forth.

In some cases, relying on the positions of the SPT SEI messages to determine which NAL units are associated with which decoding units may also not be error resilient. As one example, because the positions of the SPT SEI messages define which NAL units are associated with a decoding unit, an SPT SEI message cannot be repeated within a decoding unit (i.e., after the NAL unit immediately following the SPT SEI message and before the last NAL unit in the decoding unit, in decoding order). For example, assume that a decoding unit includes four NAL units. In this example, a first SPT SEI message would precede the four NAL units and a second SPT SEI message would follow the four NAL units. If an SPT SEI message were inserted in the middle of the two SPT SEI messages, then video decoder 30 would incorrectly determine that the first two NAL units are for a first decoding unit, and the second two NAL units are for a second, different decoding unit.

However, it may be beneficial to include one or more copies of an SPT SEI message within a decoding unit so that pertinent video data can be recovered from one of the copies if another one is lost. As described above, the SPT SEI message may include information indicating when a decoding unit is to be removed from the CBP. For instance, in an error-prone or lossy environment, an SPT SEI message may be lost, and the information within the SPT SEI message that indicates when the decoding unit is to be removed may be lost.

For example, as described above, an access unit includes video data for a picture, and a decoding unit is a subset of the access unit (assuming SubPicCpbFlag is 1). Accordingly, a decoding unit may, in some examples, include video data for one or more slices of a picture (i.e., sub-portion of a picture). Source device 12 may output the one or more slices of a decoding unit in packets (e.g., real-time transport protocol (RTP) packets). If the packet that includes the SPT SEI message is lost, video decoder 30 may not be able to accurately determine the sub-picture timing information for the other packets of the decoding unit (e.g., the removal time from the CPB).

If each packet were to include the SPT SEI message, then the loss of one packet would not impact the decoding process because video decoder 30 can determine the sub-picture timing information of the SPT SEI message from a copy of the SPT SEI message in another one of the packets. However, in some other techniques, the SPT SEI message could not be repeated since video decoder 30 used the position of the SEI message to determine which NAL units were associated with which decoding units. In other words, the prohibition of repeating SPT SEI messages in the decoding units results in a less error resilient scheme for determining which NAL units are associated with which decoding units. In some examples, the techniques of disclosure may remove prohibitions of repeating SPT SEI messages in the decoding units.

As described in more detail below, this disclosure describes examples techniques that allow video decoder 30 to determine which NAL units are associated with which decoding units in an error resilient manner. For example, video encoder 20 may generate for output and output an identifier for the decoding units. Video decoder 30 may utilize this identifier to determine which NAL units are associated with which decoding units, rather than relying on information indicating the number of NAL units associate with a decoding unit and the order in which the NAL units are received, or rather than relying on position of the SPT SEI message. The outputting and receiving of the decoding unit identifier may also allow multiple copies of the SPT SEI message, which further increases the error resiliency of the ability of video decoder 30 to determine removal times of the decoding units from the CPB.

The above described the example where the SPT SEI message is not allowed to be repeated within the decoding unit. In some cases, various other types of SEI messages may be prohibited from also being repeated within the decoding unit. For example, any SEI message that is not an SPT SEI message and for which nuh_reserved_zero_6bits for the SEI NAL unit that includes the SEI message is equal to 0 may not be allowed to be repeated within the access unit that includes the SEI message after the first VCL NAL unit and before the last NAL unit in decoding order.

For example, in some other techniques, the SEI messages are used to determine that video decoder 30 is processing a new access unit. In other words, the location of the SEI message in the coded bitstream is indicative of the beginning of an access unit. If an SEI message is repeated within an access unit, then video decoder 30 may incorrectly determine that a new access unit is being processed. Since the SEI messages indicated a new access unit, copies of SEI messages may be prohibited in these other techniques.

Similar to above, if an access unit includes multiple slices that are transmitted in an error-prone environment, it may be beneficial to include copies of the SEI messages in each packet so that if a packet is lost, the SEI messages can be recovered from one or more of the other packets of the access unit. As described in more detail, the techniques described in this disclosure may allow for multiple copies of the various SEI messages to be repeated within the access unit.

For example, video decoder 30 need not rely upon an SEI message to determine that new access unit is being processed. Rather, video decoder 30 may rely upon some other header information to determine when a new access unit is being processed. Since the existence of an SEI message is decoupled from indicating that a new access unit is being processed, video encoder 20 may include multiple copies of SEI messages in the access unit, and video decoder 30 may process multiple copies of SEI messages within the same access unit without determining that a new access unit is being processed.

In the techniques described in this disclosure, video encoder 20 may signal an identifier in each decoding unit (referred to as a decoding unit identifier, DU identifier, or DU ID). The DU identifier may be an identifier that uniquely identifies a decoding unit. For instance, the DU identifier for the first decoding unit, in decoding order, in the access unit may be 0, the DU identifier for the second decoding unit, in decoding order, in the access unit may be 1, and so forth (i.e., the DU identifier for the first decoding unit is 0, and the value of the DU identifier increases by one for each subsequent decoding unit). Other ways of uniquely identifying the decoding units with decoding unit identifiers are possible, and the techniques should not be considered limited to ascending DU identifiers for each decoding unit in decoding order.

There may be various ways in which video encoder 20 signals the DU identifier. For instance, video encoder 20 may signal the DU identifier in the slice header of a slice of a decoding unit and/or in an SEI message (e.g. the SPT SEI message), or in any other manner. In this case, the association of NAL units to the decoding units is based on the signaled DU identifiers. It may be possible to include the DU identifier in other locations as well, such as the NAL unit header.

If the NAL unit is for one or more slices, video decoder 30 may determine for which decoding unit the NAL unit is associated from the DU identifier in the slice header. Accordingly, even if there are losses in the NAL units, video decoder 30 may be able to determine which NAL unit is associated with which decoding unit based on the DU identifier.

In examples where the SEI message includes the DU identifier, it may be possible that the SEI message (e.g., the SPT SEI message) is lost, in which case, the DU identifier may be lost. In some examples, video encoder 20 may include copies of the SPT SEI message within the decoding unit to minimize the chances that the DU identifier is lost. For instance, as described above, in some cases the position of the SPT SEI message within a decoding unit may indicate which NAL units are associated with the decoding units, which meant that there could not be multiple copies of the SPT SEI messages. In the techniques described in this disclosure, video decoder 30 may utilize the DU identifier to determine which NAL units are associated with which decoding units. Accordingly, video decoder 30 need not rely upon the position of the SPT SEI messages to determine which NAL units are associated with which decoding units.

This allows for video encoder 20 to include multiple copies of the SPT SEI messages within a decoding unit within the coded bitstream, which in turn reduces the probability that the DU identifier will be lost if each copy of the SPT SEI message includes the DU identifier.

As described above, in some examples, SEI messages are not allowed to follow the first VCL NAL unit in the decoding order, in the access unit containing the SEI message. In some examples, video encoder 20 may allow all SEI messages to follow the first VCL NAL unit in decoding order, in the access unit containing the SEI message. However, the SEI message may not be positioned after the last VCL NAL unit, in decoding order, in the access unit.

As one example, video encoder 20 may include an SEI message before the first VCL NAL unit in decoding order. Video encoder 20 may include a copy of the SEI message after the first VCL NAL unit in decoding order in the access unit. In this example, video encoder 20 may not include a copy of the SEI message after the last VCL NAL unit in decoding order in the access unit.

In the examples where video encoder 20 allows the various types of SEI messages to be repeated in the decoding unit or access unit, video encoder 20 may specify additional information regarding the SEI messages. As one example, video encoder 20 may specify an application scope to which the information carried in an SEI message applies. As another example, video encoder 20 may specify where an SEI message can be present in the access unit and/or decoding unit. As yet another example, video encoder 20 may set a restriction on the contents of the multiple instances of particular types of SEI messages.

Video decoder 30 utilizes such information for the SEI messages for decoding data in the NAL units. In some examples, video decoder 30 may be preconfigured with information of the SEI messages such as information indicating restriction on the contents of the multiple instances of particular types of SEI messages or preconfigured with information of where the SEI messages can be located within the access unit and/or decoding unit. In these cases, it may not be necessary for video encoder 20 to specify where an SEI message can be present or signal information indicating any restriction on the contents of the multiple instances of particular types of SEI messages.

As described above, an access unit includes video data for at least one picture. In some examples, the access unit may include video data for multiple layers, and video encoder 20 may encode a video bitstream with multiple layers, such as in the multi-layer extension of high efficiency video coding (HEVC) standard.

The multiple layers include a base layer and one or more non-base layers. In some examples, a base layer may include video data for constructing a picture, and a non-base layer may be a spatial or quality enhancement layer which includes video data for enhancing the quality of the picture in the base layer. In some examples, such for multiview video coding, the base layer may include video data for pictures of a particular view (e.g., a base view that does not require any other view of inter-prediction), and a non-base layer may include texture of a different view, depth of a different view, and other such examples.

In the techniques described in this disclosure, video encoder 20 may transport the different layers in different channels (e.g., using multi-session transmission (MST) similarly defined in IETF RFC 6190 (publically available in http://tools.ietf.org/rfc/rfc6190.txt). The techniques described in this disclosure are extendable to examples in which multi-session transmission is utilized for encoding multi-layers. For example, the techniques described in this disclosure for including SEI message after the first VCL NAL unit in an access unit are also applicable to examples of multi-session transmission. As one example, video encoder 20 may include SEI NAL units between two consecutive VCL NAL units within an access unit without the need of moving the SEI NAL units before the first VCL NAL unit of the access unit.

Because the SEI NAL unit includes SEI messages for the multi-session transmission techniques, video decoder 30 may be able to implement the depacketization process in a more simplified manner. For example, video decoder 30 may be able to decode SEI messages for the multi-session transmission techniques from within the access unit, rather than all from the beginning of the access unit. Because multiple copies of the SEI message are available throughout the access unit, video decoder 30 may be able to depacketize the received packets in a more efficient manner.

The techniques of this disclosure may be applied in conjunction with one another or separately. For example, if video encoder 20 includes a DU identifier, then video encoder 20 need not necessarily include multiple copies of the SPT SEI message in all examples, but may include multiple copies of the SPT SEI message in some examples. As another example, video encoder 20 may include multiple copies of various types of SEI messages even if video encoder 20 does not include DU identifiers. As yet another example, in examples where video encoder 20 includes the DU identifiers, video encoder 20 need not necessarily include multiple copies of the SEI messages other than the SPT SEI message. In general, the techniques described in this disclosure may be advantageous in providing error resilient schemes for error-prone environment in which information may be lost in signaling.

As described above, in one example, video encoder 20 includes the DU identifier in the slice header. Table 2 below provides example pseudo-code for the manner in which video encoder 20 may include the DU identifier in the slice header, and the manner in which video decoder 30 may parse the slice header to determine the DU identifier.

TABLE 2

Signaling in Slice Header

| slice_header( ) { | Descriptor |
|---|---|
|     first_slice_in_pic_flag | u(1) |
|     if( RapPicFlag ) | |
|         no_output_of_prior_pics_flag | u(1) |
|     pic_parameter_set_id | ue(v) |
|     if( !first_slice_in_pic_flag ) | |
|         slice_address | u(v) |
|     if( sub_pic_cpb_params_present_flag ) | |
|         decoding_unit_id | ue(v) |
|     ... | |
| } | |

In this example, decoding_unit_id refers to the DU identifier and specifies the identifier of the decoding unit the slice belongs to. The value of decoding_unit_id may be in the range of 0 to PicSizeInCtbsY−1, inclusive. PicSizeInCtbsY may indicate the number of coding tree units (CTUs) in a picture, which is equal to the number of coding treeblocks (CTBs) in the luma component of a picture.

In the example where video encoder 20 includes the decoding unit identifier in the slice header, a decoding unit identified by a particular value of the DU identifier (e.g., DU ID or duID) may include and may only include all coded slices NAL units with decoding_unit_id equal to the DU identifier and their associated non-VCL NAL units in the access unit. Within one access unit, for any two decoding units (e.g., decoding unit A and decoding unit B) with decoding_unit_id equal to duIDa and duIDb, respectively, where duIDa is less than duIDb, decoding unit A may precede decoding unit B in decoding order. In other words, the decoding unit with the smaller DU identifier precedes the decoding unit with the larger DU identifier in decoding order. Moreover, a NAL unit of one decoding unit may not reside, in decoding order, between two NAL units of another decoding unit. In other words, in the above example, NAL units of a decoding unit are contiguous.

As described above, in some examples, video encoder 20 may include the DU identifier in an SEI message (e.g., the SPT SEI message), and the SPT SEI message includes information that indicates when decoding unit is to be removed. The following describes some examples techniques for video encoder 20 to include the DU identifier in an SEI message. To avoid confusion, in the following the name of the sub-picture timing (SPT) SEI message is changed to decoding unit information SEI message. In other words, in some examples, video encoder 20 outputs and video decoder 30 receives the DU identifier in an SEI message that also includes information indicating removal time of the decoding unit from the CPB.

Table 3 below provides example pseudo-code for the manner in which video encoder 20 may include the DU identifier in an SEI message, and the manner in which video decoder 30 may parse the SEI message to determine the DU identifier. In the following, the name of the sub-picture timing (SPT) SEI message is changed to decoding unit information SEI message, and the syntax and semantics may be as follows. Other parts are same as in HEVC WD8, with "sub-picture timing SEI message" replaced by "decoding unit information SEI message." The decoding unit information SEI message may provide CPB removal time (e.g., CPB removal delay information) for the decoded unit associated with the SEI message.

TABLE 3

| Signaling in SEI Message | |
|---|---|
| decoding_unit_info( payloadSize ) { | Descriptor |
|    decoding_unit_id | ue(v) |
|    du_cpb_removal_delay | u(v) |
| } | |

In HEVC WD8, the sub-picture timing (SPT) SEI message may be similar to Table 3. However, the SPT SEI message of HEVC WD8 did not include the decoding_unit_id syntax element, and only included the du_cpb_removal_delay syntax element. In some of the example techniques described in this disclosure, because the SEI message also includes the decoding_unit_id, the SPT SEI message is renamed to decoding unit information SEI message.

In some examples, video encoder 20 generates for output and outputs syntax elements and video decoder 30 receives syntax elements that indicate the presence of the decoding unit information SEI message in the bitstream. As one example, video encoder 20 outputs the CpbDpbDelaysPresentFlag and the sub_pic_cpb_params_present_flag. If CpbDpbDelaysPresentFlag is equal to 1 and sub_pic_cpb_params_present_flag is equal to 1, video decoder 30 may determine that one or more than one decoding unit information SEI message is present in each decoding unit in the coded video sequence (i.e., one or more decoding unit information SEI messages). If CpbDpbDelaysPresentFlag is equal to 0 or sub_pic_cpb_params_present_flag is equal to 0, video decoder 30 may determine that no decoding unit information SEI messages are present in any access unit of the coded video sequence.

In accordance with one or more examples described in this disclosure, the NAL units to which the decoding unit information SEI message applies, also referred to as the NAL units associated with a decoding unit information SEI message, consists, in decoding order, of the SEI NAL unit containing the decoding unit information SEI message and all subsequent NAL units in the access unit up to but not including any subsequent SEI NAL unit containing a decoding unit information SEI message with a different value of decoding_unit_id. In these examples, the definition of decoding_unit_id may be the same as the definition of decoding_unit_id described above with respect to Table 2, but is included in the SEI message (e.g., the decoding unit information SEI message). For example, a decoding unit identified by a particular value of the DU identifier (e.g., DU ID or duID) may include and may only include all NAL units associated with all decoding unit information SEI messages having decoding_unit_id equal to the DU identifier in the access unit. As above, a decoding unit with a smaller decoding unit identifier is earlier in decoding order than a decoding unit with a larger decoding unit identifier. As above, a NAL unit of one decoding unit may not reside, in decoding order, between two NAL units of another decoding unit.

du_cpb_removal_delay may specify how many sub-picture clock ticks video decoder 30 is to wait after removal from the CPB of the first decoding unit in the access unit associated with the most recent buffering period SEI message in a preceding access unit before video decoder 30 removes from the CPB the decoding unit associated with the decoding unit information SEI message. This value may also be used to calculate an earliest possible time of arrival of decoding unit data into the CPB for the hypothetical stream scheduler (HSS), as specified in Annex C of HEVC WD8.

The syntax element may be represented by a fixed length code whose length in bits is given by cpb_removal_delay_length_minus1+1. The du_cpb_removal_delay may be the remainder of a modulo $2^{(cpb\_removal\_delay\_length\_minus1+1)}$ counter.

In some examples, the value of cpb_removal_delay_length_minus that determines the length (in bits) of the syntax element du_cpb_removal_delay may be the value of cpb_removal_delay_length_minus1 coded in the sequence parameter set that is active for the coded picture associated with the decoding unit information SEI message. However, du_cpb_removal_delay specifies a number of sub-picture clock ticks relative to the removal time of the first decoding unit in the preceding access unit containing a buffering period SEI message, which may be an access unit of a different coded video sequence.

Table 3 provided example pseudo-code for one example of the decoding unit information SEI message, in which the name of the SPT SEI message was changed to decoding unit information SEI message because the decoding unit information SEI message included information that was previously a part of the SPT SEI message and further included the DU identifier for the decoding unit associated with message. In some examples, there may potentially be other modifications to the sub-picture timing (SPT) SEI message.

For example, U.S. Provisional Application No. 61/705, 119 (herein after application '119), filed on Sep. 24, 2012 and U.S. Provisional Application No. 61/708,475 (hereinafter application '475), filed on Oct. 1, 2012, the entire content of each of which is incorporated herein by reference, describe some possible modifications to the SPT SEI message relative to the SPT SEI message described in HEVC WD8. Application '119 and application '475 describe including an application operation points syntax structure in the SPT SEI message and changing the du_cpb_removal_delay syntax element to du_spt_cpb_removal_delay, which is defined below.

The techniques described in this disclosure are also applicable to examples where the SPT SEI message changed from HEVC WD8 to the SPT SEI message in application '119 and application '475. Table 4 below provides example pseudo-code for the manner in which video encoder 20 may signal the DU identifier in an alternate example of an SEI message, and the manner in which video decoder 30 may parse the SEI message to determine the DU identifier. As with Table 3, to avoid confusion, the name of the SPT SEI message is changed to decoding unit information SEI message because the decoding unit information SEI message includes the DU identifier in addition to the information in the SPT SEI message as described in application '119 and application '475.

TABLE 4

Alternative Signaling in SEI Message

| decoding_unit_info( payloadSize ) { | Descriptor |
|---|---|
| applicable_operation_points( ) | |
| decoding_unit_id | ue(v) |
| if( !sub_pic_cpb_params_in_pic_timing_sei_flag ) | |
| du_spt_cpb_removal_delay | u(v) |
| } | | sub_pic_cpb_params_in_pic_timing_sei_flag equal to 1 specifies that sub-picture level CPB removal delay parameters are present in picture timing SEI messages and no sub-picture timing SEI message is present. sub_pic_cpb_params_in_pic_timing_sei_flag equal to 0 specifies that sub-picture level CPB removal delay parameters are present in sub-picture timing SEI messages and picture timing SEI messages do not include sub-picture level CPB removal delay parameters.

As above with respect to Table 3, the decoding unit information SEI message provides CPB removal delay information for the decoding unit associated with the SEI message. The following may apply for the decoding unit information SEI message syntax and semantics.

The syntax elements sub_pic_cpb_params_present_flag, sub_pic_cpb_params_in_pic_timing_sei_flag, and cpb_removal_delay_length_minus1, and the variable CpbDpbDelaysPresentFlag may be found in or derived from syntax elements found in the hrd_parameters( ) syntax structure and the sub_layer_hrd_parameters( ) syntax structure applicable to any of the operation points that the decoding unit information SEI message applies to. The bitstream (or a part thereof) refers to the bitstream subset (or a part thereof) associated with any of the operation points the decoding unit information SEI message applies to.

Similar to above with respect to Table 3, video encoder 20 outputs the CpbDpbDelaysPresentFlag and the sub_pic_cpb_params_present_flag that video decoder 30 utilizes to determine the presence of the decoding unit SEI message in the bitstream. In the example of Table 4, if CpbDpbDelaysPresentFlag is equal to 1 and sub_pic_cpb_params_present_flag is equal to 1, video decoder 30 may determine that one decoding unit information SEI message applicable to the specified operation points is present in each decoding unit in the coded video sequence. Otherwise (e.g., either CpbDpbDelaysPresentFlag is equal to 0 or sub_pic_cpb_params_present_flag is equal to 0), video decoder 30 may determine that no decoding unit information SEI messages applicable to the specified operation points is present in the coded video sequence.

Similar to the description with respect to Table 3, the NAL units to which the decoding unit information SEI message applies, also referred to as the NAL units associated with a decoding unit information SEI message, consists, in decoding order, of the SEI NAL unit containing the decoding unit information SEI message and all subsequent NAL units in the access unit up to but not including any subsequent SEI NAL unit containing a decoding unit information SEI message with a different value of decoding_unit_id. The definition of decoding_unit_id may be the same as that described above with respect to Table 3, and a decoding unit with smaller DU identifier is earlier in decoding order than a decoding unit with a larger DU identifier. In the example of Table 4, du_spt_cpb_removal_delay may specify the duration, in units of sub-picture clock ticks (see subclause E.2.1 of HEVC WD8), between removal from the CPB of the last decoding unit in decoding order in the current access unit containing the decoding unit information SEI message and the decoding unit associated with the decoding unit information SEI message. This value may also be used to calculate an earliest possible time of arrival of decoding unit data into the CPB for the hypothetical sequence scheduler (HSS), as specified in Annex C of HEVC WD8. The syntax element may be represented by a fixed length code whose length in bits is given by du_cpb_removal_delay_length_minus1+1. When the decoding unit associated with the decoding unit information SEI message is the last decoding unit in the current access unit. The value of du_spt_cpb_removal_delay may be equal to 0.

Alternatively, du_spt_cpb_removal_delay may specify the duration, in units of sub-picture clock ticks (see subclause E.2.1), between removal from the CPB of the next decoding unit in decoding order in the current access unit containing the decoding unit information SEI message and the decoding unit associated with the decoding unit information SEI message. This value may also be used to calculate an earliest possible time of arrival of decoding unit data into the CPB for the HSS, as specified in Annex C of HEVC WD8. The syntax element is represented by a fixed length code whose length in bits is given by du_cpb_removal_delay_length_minus1+1. When the decoding unit associated with the decoding unit information SEI message is the last decoding unit in the current access unit, the value of du_spt_cpb_removal_delay may be equal to 0. Alternatively, no decoding unit information SEI message may be associated with the last decoding unit in each access unit.

The above examples described techniques for signaling a decoding unit identifier that video decoder 30 utilizes to determine which NAL units are associated with which decoding units. For example, if the slice header indicates a decoding unit identifier, then video decoder 30 may determine that the NAL unit that includes the slice is associated with the decoding unit indicated in the slice header. As another example, if an SEI message (e.g., the decoding unit information SEI message) indicates the decoding unit identifier, then video decoder 30 determines that all NAL units that follow the SEI message until the next SEI NAL unit that includes a decoding unit information SEI message with a decoding unit identifier different than the decoding unit identifier of the previous SEI message. This allows video encoder 20 to include multiple copies of the decoding unit information SEI message, which in turn allows video decoder 30 to determine the removal time of a decoding unit from the CPB from one of a plurality of decoding unit information SEI message in case one of the other decoding unit information SEI message is lost in transmission.

In some examples, video encoder 20 may generate for output and output and video decoder 30 may receive multiple copies of various types of SEI messages. As described above, the following aspects are specified for all SEI messages: a) an application scope that the information carried in an SEI message applies to; b) where an SEI message can be present; and c) a restriction on the contents of multiple instances of a particular type of SEI message.

The following conventions are assumed for describing the application scope, where messages can be present, and restrictions on the contents of multiple instances SEI messages. An SEI message is considered associated with the value of nuh_reserved_zero_6bits in the NAL unit header of the SEI NAL unit containing the SEI message. In the following, "layer ID" is used interchangeably with "nuh_reserved_zero_6bits," because nuh_reserved_zero_6bits identifies the layer in scalable video coding.

As above, the acronym AU stands for access unit. The applicable operation points for each buffering period SEI message, picture timing SEI message or sub-picture timing SEI message is as specified in application '119 and application '475. An operation point is identified by a set of nuh_reserved_zero_6bits values, denoted as OpLayerIdSet, and a temporal identification value (TemporalId) value, denoted as OpTid, and the associated bitstream subset derived as the output of the sub-bitstream extraction process as specified in sub-clause 10.1 of HEVC WD8 with OpTid and OpLayerIdSet as inputs that are independently decodable.

The TemporalId value of the pictures indicate whether the pictures can be used for inter-predicting other pictures. For example, a first picture cannot be used for inter-prediction of a second picture if the TemporalId value of the first picture is greater than the TemporalId value of the second picture.

In this way, pictures with the greatest TemporalId values can be removed (extracted) without any effect on the video decoding because the pictures cannot be used for inter-predicting any of the remaining pictures. Similarly, pictures with the greatest and next greatest TemporalId values can be removed without any effect on the video decoding because these picture cannot be used for inter-predicting any of the remaining pictures, and so forth. While removing such pictures based on the TemporalId values may not effect video decoding and improve bandwidth utilization (e.g., due to the removal of pictures), there may be negative impact on the quality of the video if such pictures are removed.

The sub-bitstream extraction process specified in sub-clause 10.1 describes certain requirements for conformance. As one example, any sub-bitstream extracted from a bitstream by the process with any target highest TemporalId value in the range from 0 to 6, inclusive, and the target layer identifier list that only includes the value of nuh_reserved_zero_6bits equal to zero is considered to be a confirming bitstream.

A scene period may include and may only include all AUs starting from an AU containing a scene information SEI message to the next AU, in decoding order, containing a scene information SEI message or the end of the coded video sequence, whichever is earlier, in decoding order. A post-filter period may include and may only include all AUs starting from an AU containing a post-filter hint SEI message to the next AU, in decoding order, containing a post-filter hint SEI message or the end of the coded video sequence, whichever is earlier, in decoding order.

If the sub-picture timing SEI message does not include a decoding unit ID, a decoding unit may include and may only include a set of NAL units within an AU from an SEI NAL unit that contains a sub-picture timing SEI message to the next SEI NAL unit that contains a sub-picture timing SEI message or the end of the AU, whichever is earlier, in decoding order. Otherwise, a decoding unit may include and may only include a set of NAL units within an AU from an SEI NAL unit that contains a sub-picture timing SEI message to the next SEI NAL unit that contains a sub-picture timing SEI message with a different value of decoding unit ID or the end of the AU, whichever is earlier, in decoding order.

TABLE 5

Association, Presence, and Restriction for SEI messages

| SEI message (payloadType) | Application scope | Presence | Multi-instance restriction |
| --- | --- | --- | --- |
| Buffering period (0) | The buffering period containing the SEI message | In any AU with TemporalId equal to 0 | All instances (applicable to any particular operation point) within an AU shall be identical |
| Picture timing (1) | The AU containing the SEI message | In any AU with any value of TemporalId | All instances (applicable to any particular operation point) within an AU shall be identical |
| Pan-scan rectangle (2) | Specified by syntax | In any of the applicable AUs with TemporalId equal to 0 | All instances (associated with a particular value of layer ID) within the application scope shall be identical |
| Filler payload (3) | The AU containing the SEI message | In any AU with any value of TemporalId | No restriction |

TABLE 5-continued

Association, Presence, and Restriction for SEI messages

| SEI message (payloadType) | Application scope | Presence | Multi-instance restriction |
| --- | --- | --- | --- |
| User data registered (4) | Unspecified | In any AU with any value of TemporalId | No restriction |
| User data unregistered (5) | Unspecified | In any AU with any value of TemporalId | No restriction |
| Recovery point (6) | The AU containing the SEI message | In any AU with TemporalId equal to 0 | All instances (associated with a particular value of layer ID) within an AU shall be identical |
| Scene information (9) | The scene period containing the SEI message | In any AU with TemporalId equal to 0 | All instances (associated with a particular value of layer ID) within an AU shall be identical |
| Full-frame snapshot (15) | The AU containing the SEI message | In any AU with any value of TemporalId | All instances (associated with a particular value of layer ID) within an AU shall be identical |
| Progressive refinement segment start (16) | The AU containing the SEI message | In any AU with any value of TemporalId | All instances (associated with a particular value of layer ID) within an AU shall be identical |
| Progressive refinement segment end (17) | The AU containing the SEI message | In any AU with any value of TemporalId | All instances (associated with a particular value of layer ID) within an AU shall be identical |
| Film grain characteristics (19) | Specified by syntax | In any of the applicable AUs with TemporalId equal to 0 | All instances (associated with a particular value of layer ID) within the application scope shall be identical |
| Deblocking filter display preference (21) | Specified by syntax | In any of the applicable AUs with TemporalId equal to 0 | All instances (associated with a particular value of layer ID) within the application scope shall be identical |
| Post-filter hint (22) | The post-filter period containing the SEI message | In any AU with TemporalId equal to 0 | All instances (associated with a particular value of layer ID) within an AU shall be identical |
| Tone mapping information (23) | Specified by syntax | In any of the applicable AUs with TemporalId equal to 0 | All instances (associated with a particular value of layer ID) within the application scope shall be identical |
| Frame packing arrangement (45) | Specified by syntax | In any of the applicable AUs with TemporalId equal to 0 | All instances (associated with a particular value of layer ID) within the application scope shall be identical |
| Display orientation (47) | Specified by syntax | In any of the applicable AUs with TemporalId equal to 0 | All instances (associated with a particular value of layer ID) within the application scope shall be identical |
| Structure of pictures (SOP) description (128) | The SOP containing the AU that contains the SEI message | In any AU with TemporalId equal to 0 | All instances (associated with a particular value of layer ID) within the application scope |
| Field indication (129) | The AU containing the SEI message | In any AU with any value of TemporalId | All instances (associated with a particular value of layer ID) within an AU shall be identical |
| Decoded picture hash (130) | The AU containing the SEI message | In any AU with any value of TemporalId | All instances (associated with a particular value of layer ID) within an AU shall be identical |
| Active parameter sets (131) | The coded video sequence containing the SEI message | In any AU with TemporalId equal to 0 | All instances (associated with a particular value of layer ID) within the application scope shall be identical |

TABLE 5-continued

Association, Presence, and Restriction for SEI messages

| SEI message (payloadType) | Application scope | Presence | Multi-instance restriction |
| --- | --- | --- | --- |
| Sub-picture timing (132) | The decoding unit containing the SEI message | In any AU with any value of TemporalId | No restriction |

Table 5 illustrates different types of SEI messages, and illustrates the relationship between the different types of SEI messages, the temporal identification value of the access unit, and whether there are any restrictions and the types of restrictions on the SEI message. For example, video encoder 20 may determine a type of SEI message and may determine the temporal identification value of the access unit. Based on the temporal identification value and the type of SEI message, video encoder 20 may determine whether the presence of the SEI message is allowed.

As one example, assume that the SEI message type is the buffer period SEI message. In this example, if the temporal identification value is not equal to 0, video encoder 20 may determine that the presence of the buffer period SEI message is not allowed. As another example, assume that the SEI message type is the picture timing SEI message. In this example, regardless of the temporal identification value, video encoder 20 may determine that the presence of the picture timing SEI message is allowed.

In accordance with the techniques described in this disclosure, video encoder 20 and video decoder 30 are examples of a video coder configured to implement one or more example techniques described in this disclosure. For example, video encoder 20 may signal identifiers for the decoding units (e.g., encode and signal the identifiers for the decoding units), and video decoder 30 may receive the identifiers for the decoding units (e.g., receive and decode the identifiers for the decoding units). In this sense, a video coder, such as video encoder 20 and video decoder 30, may be configured to code (e.g., encode or decode) identifiers for decoding units.

The video coder may be configured to code a unique identifier for each decoding unit in an access unit such that an identifier for one decoding unit in the access unit is different than an identifier for any other decoding unit in the access unit. In some examples, the video coder may associate network abstraction layer (NAL) units to the decoding units in the access unit based on the unique identifier for each of the decoding units. Also, in some examples, the video coder may repeat supplemental enhancement information (SEI) messages within a decoding unit or an access unit.

To code each DU, the video coder may code a first identifier for a first DU, and code a second, different identifier for a second, different DU. In this example, the second identifier may be the first identifier incremented by one.

In some examples, the video coder may code the unique identifier for each decoding in a slice header. In these examples, the unique identifier may identify the decoding unit the slice belongs to, and the video coder may determine that the NAL unit that includes the slice is associated with the decoding unit identified by the decoding unit identifier in the slice header. In some examples, the video coder may code the unique identifier for decoding unit in an SEI message. For example, the video coder may code the unique identifier in an SEI message (e.g., the decoding unit information SEI message) that also includes information about when the decoding unit is to be removed from the coded picture buffer (CPB). The unique identifier for a decoding unit may identify the decoding unit that contains the decoding unit information SEI message.

In one or more example techniques, the video coder may code a first identifier for a first decoding unit in the access unit, and code a second, different identifier for a second, different decoding unit in the access unit. In some examples, when a value of the first identifier is less than a value of the second identifier, the first decoding unit may precede the second decoding unit in decoding order. In some examples, the video coder may code the unique identifier for each decoding unit as an index of the decoding unit into the list of all decoding units in the access unit in decoding order.

In some instances, the video coder may code a first video coding layer (VCL) network abstraction layer (NAL) unit in an access unit (AU). The video coder may also code a supplementation enhancement information (SEI) message that follows the first VLC NAL unit in decoding order. In some examples, the video coder may also code the SEI message such that the SEI message precedes the last VCL NAL unit in the AU in decoding order.

Figure 2A:
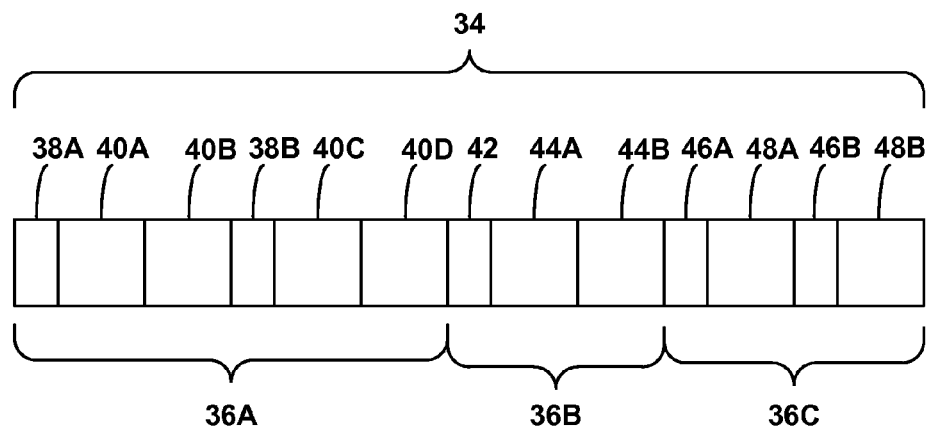
FIGS. 2A and 2B are conceptual diagrams illustrating examples of access units that include decoding unit identifiers in accordance with the techniques described in this disclosure.
Figure 2B:
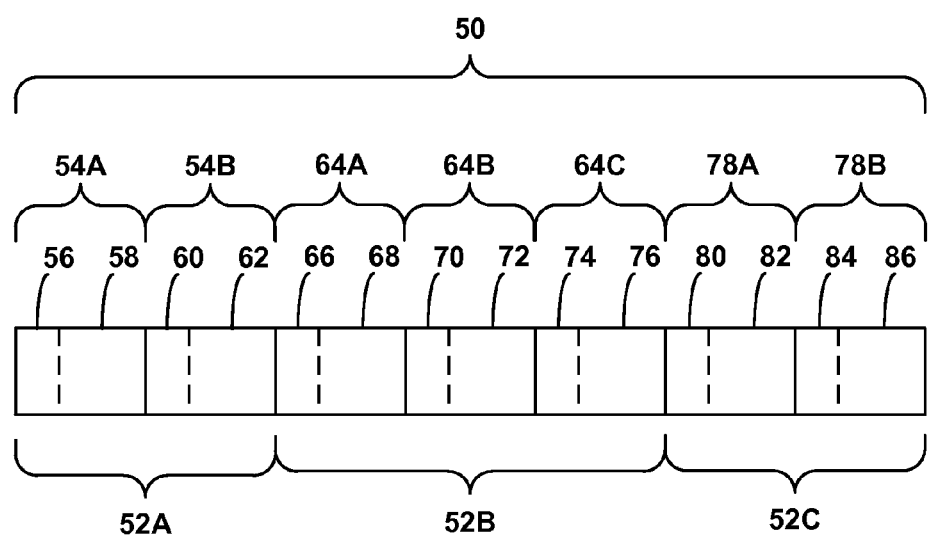

FIGS. 2A and 2B are conceptual diagrams illustrating examples of access units that include decoding unit identifiers in accordance with the techniques described in this disclosure. FIG. 2A illustrates access unit 34 and FIG. 2B illustrates access unit 50. Access unit 34 and access unit 50 include video data needed to decode at least one picture (e.g., one or more layers for decoding a picture or multiple pictures of different views for the same time instance). Video encoder 20 outputs access unit 34 or access unit 50 as part of the coded bitstream that video decoder 30 receives via link 16 or storage device 32.

In FIGS. 2A and 2B, access unit 34 and access unit 50 include a plurality of decoding units, which means that video encoder 20 outputted the SubPicCpbFlag for access unit 34 and access unit 50 as 1 to indicate to video decoder 30 that operation on the sub-picture level is allowed for access unit 34 and access unit 50.

In FIG. 2A, access unit 34 includes decoding units 36A-36C (collectively referred to as "decoding units 36"). Decoding unit 36A includes a first SEI NAL unit 38A and a second SEI NAL unit 38B. Both SEI NAL units 38A and 38B include an SEI message (e.g., decoding unit information SEI message) that indicates information regarding the removal time of decoding unit 36A and also includes a decoding unit identifier for decoding unit 36A. Decoding unit 36A also includes NAL units 40A-40D.

Decoding unit 36B includes a third SEI NAL unit 42 that includes an SEI message that indicates information regarding the removal time of decoding unit 36B and also includes a decoding unit identifier for decoding unit 36B. The decoding unit identifier for decoding unit 36B is different than the decoding unit identifier for decoding unit 36A (e.g., one more than the decoding unit identifier for decoding unit 36A). Decoding unit 36B also includes NAL units 44A and 44B.

Decoding unit 36C includes a fourth SEI NAL unit 46A and a fifth SEI NAL unit 46B. Both SEI NAL units 46A and 46B include an SEI message (e.g., decoding unit information SEI message) that indicates information regarding the removal time of decoding unit 36C and also includes a decoding unit identifier for decoding unit 36C. Decoding unit 36C also includes NAL units 48A and 48B.

Video decoder 30 may determine which NAL units are associated with which decoding units based on the decoding unit information SEI message. For example, video decoder 30 may determine that SEI NAL unit 38A and the NAL units (e.g., NAL units 40A and 40B) that follow SEL NAL unit 38A are associated with decoding unit 36A because the decoding unit information SEI message of SEI NAL unit 38A included the decoding unit identifier for decoding unit 36A. Then, video decoder 30 may determine that SEI NAL unit 38B is also part of decoding unit 36A because the decoding unit information SEI message of SEI NAL unit 38B is a copy of the decoding unit information SEI message of SEI NAL unit 38A (e.g., includes the same removal time information and the same decoding unit identifier). In this example, video decoder 30 may determine that NAL units 40C and 40D are also associated with decoding unit 36A because these NAL units follow SEL NAL unit 38B and precede another SEI NAL unit with a decoding unit information SEI message.

Video decoder 30 may determine that SEI NAL unit 42 does not belong to decoding unit 36A because the decoding unit identifier in the decoding unit information SEI message of SEI NAL unit 42 is different than the decoding unit identifier in the decoding unit information SEI message for SEI NAL units 38A and 38B. In this case, video decoder 30 may determine that SEI NAL unit 42 is associated with another decoding unit (e.g., decoding unit 36B), and NAL units 44A and 44B are also associated with decoding unit 36B because these NAL units follow SEI NAL unit 42 and precede another SEI NAL unit with a decoding unit information SEI message that includes a different decoding unit identifier.

Video decoder 30 may determine that SEI NAL unit 46A is associated with a different decoding unit (e.g., decoding unit 36C) because the decoding unit identifier in the decoding unit information SEI message of SEI NAL unit 46A is different than the previous decoding unit identifiers (e.g., one greater than the previous). Video decoder 30 determines that NAL unit 48A is associated with decoding unit 36C because NAL unit 48A follows SEI NAL unit 46A and precedes SEI NAL unit 46B that includes a decoding unit information SEI message.

In this example, SEI NAL unit 46B includes a decoding unit information SEI message that includes the same decoding unit identifier as the decoding unit information SEI message of SEI NAL unit 46A (e.g., the decoding unit information SEI messages are copies). Video decoder 30 may then determine that NAL unit 48B is associated with decoding unit 36C because NAL unit 48B is the last NAL unit in access unit 34.

In FIG. 2A, examples of the decoding unit information SEI message include the examples described above with respect to Tables 3 and 4. Also, in FIG. 2A, the NAL units that belong to a decoding unit are contiguous (i.e., NAL units for other decoding units are not interspersed with NAL units of a decoding unit).

In FIG. 2A, video encoder 20 may generates for output and output the decoding unit identifiers for each decoding unit in the corresponding decoding units. For example, video encoder 20 includes the decoding unit identifiers in the decoding unit information SEI messages of SEI NAL unit 38A and SEI NAL unit 38B in the corresponding decoding unit 36A, and outputs the decoding unit identifiers as part of the decoding unit information SEI messages of SEI NAL units 38A and 38B. Video encoder 20 includes the decoding unit identifiers in the decoding unit information SEI message of SEI NAL unit 42 in the corresponding decoding unit 36B, and includes the decoding unit identifiers in the decoding unit SEI messages of SEI NAL unit 46A and SEI NAL unit 46B in the corresponding decoding unit 36C. In these examples, video encoder 20 outputs the decoding unit identifiers as part of the respective decoding unit SEI messages of SEI NAL units 42, 46A, and 46B.

The inclusion of the decoding unit SEI messages allows video decoder 30 to determine which NAL units are associated with which decoding units based on the decoding unit identifiers so that even if a NAL unit is lost, video decoder 30 can still determine which NAL units are associated with which decoding units. For example, assume that NAL unit 40C is lost. In this example, video decoder 30 may still determine that NAL unit 40D is associated with decoding unit 36A because NAL unit 40D is subsequent to SEI NAL unit 38B, whose decoding unit information SEI message indicated a decoding unit identifier for decoding unit 36A, and precedes SEI NAL unit 42, whose decoding unit information SEI message indicated a decoding unit identifier for decoding unit 36B. Moreover, with the decoding unit SEI message indicating the decoding unit identifiers, video encoder 20 may include multiple copies of the decoding unit SEI message in a decoding unit.

As illustrated in FIG. 2B, access unit 50 includes decoding units 52A-52C (collectively referred to as "decoding units 52"). Decoding unit 52A includes slice NAL units 54A and 54B, decoding unit 52B includes slice NAL units 64A-64C, and decoding unit 52C includes slice NAL units 78A and 78B. Each of slice NAL units includes a slice header and a slice body. The slice header includes header information including a decoding unit identifier, and the slice body includes video data for decoding the slice.

For example, slice NAL unit 54A includes slice header 56 and slice body 58, and slice NAL unit 54B includes slice header 60 and slice body 62. In this example, slice header 56 of slice NAL unit 54A and slice header 60 of slice NAL unit 54B each include the same decoding unit identifier, which video decoder 30 utilizes to determine that NAL unit 54A and NAL unit 54B are associated with the same decoding unit (e.g., decoding unit 52A).

Slice NAL unit 64A includes slice header 66 and slice body 68, slice NAL unit 64B includes slice header 70 and slice body 72, and slice NAL unit 64C includes slice header 74 and slice body 76. In this example, slice header 66 of slice NAL unit 64A, slice header 70 of slice NAL unit 64B, and slice header 74 of slice NAL unit 64C each include the same decoding unit identifier, which video decoder 30 utilizes to determine that NAL unit 64A, NAL unit 64B, and NAL unit 64C are associated with the same decoding unit (e.g., decoding unit 52B).

Slice NAL unit 78A includes slice header 80 and slice body 82, and slice NAL unit 78B includes slice header 84 and slice body 86. In this example, slice header 80 of slice NAL unit 78A and slice header 84 of slice NAL unit 78B each include the same decoding unit identifier, which video decoder 30 utilizes to determine that NAL unit 78A and NAL unit 78B are associated with the same decoding unit (e.g., decoding unit 52C).

In FIG. 2B, examples of the decoding unit information SEI message include the examples described above with respect to Table 2. Similar to FIG. 2A, in FIG. 2B, the NAL units that belong to a decoding unit are contiguous (i.e., NAL units for other decoding units are not interspersed with NAL units of a decoding unit).

As illustrated, video encoder 20 includes the decoding unit identifier in slice headers 56 and 60 for corresponding decoding unit 52A, and outputs the decoding unit identifier as part of the slice headers 56 and 60. Also, video encoder 20 includes the decoding unit identifier in slice headers 66, 70, and 74 for corresponding decoding unit 52B, and outputs the decoding unit identifier as part of the slice headers 66, 70, and 74. Similarly, video encoder 20 includes the decoding unit identifier in slice headers 80 and 84 for corresponding decoding unit 52C, and outputs the decoding unit identifier as part of the slice headers 80 and 84.

In the example illustrated in FIG. 2B, video decoder 30 need not rely on positions of SPT SEI messages to determine which slice NAL unit is associated with which decoding unit. Rather, video decoder 30 utilizes the decoding unit identifier indicated in the slice headers of the slice NAL unit to determine which slice NAL unit is associated with which decoding unit. In this case, even if a slice NAL unit is lost (e.g., slice NAL unit 56B), video decoder 30 may still be capable of determining which NAL unit is associated with which decoding units based on the slice header.

Figure 3:
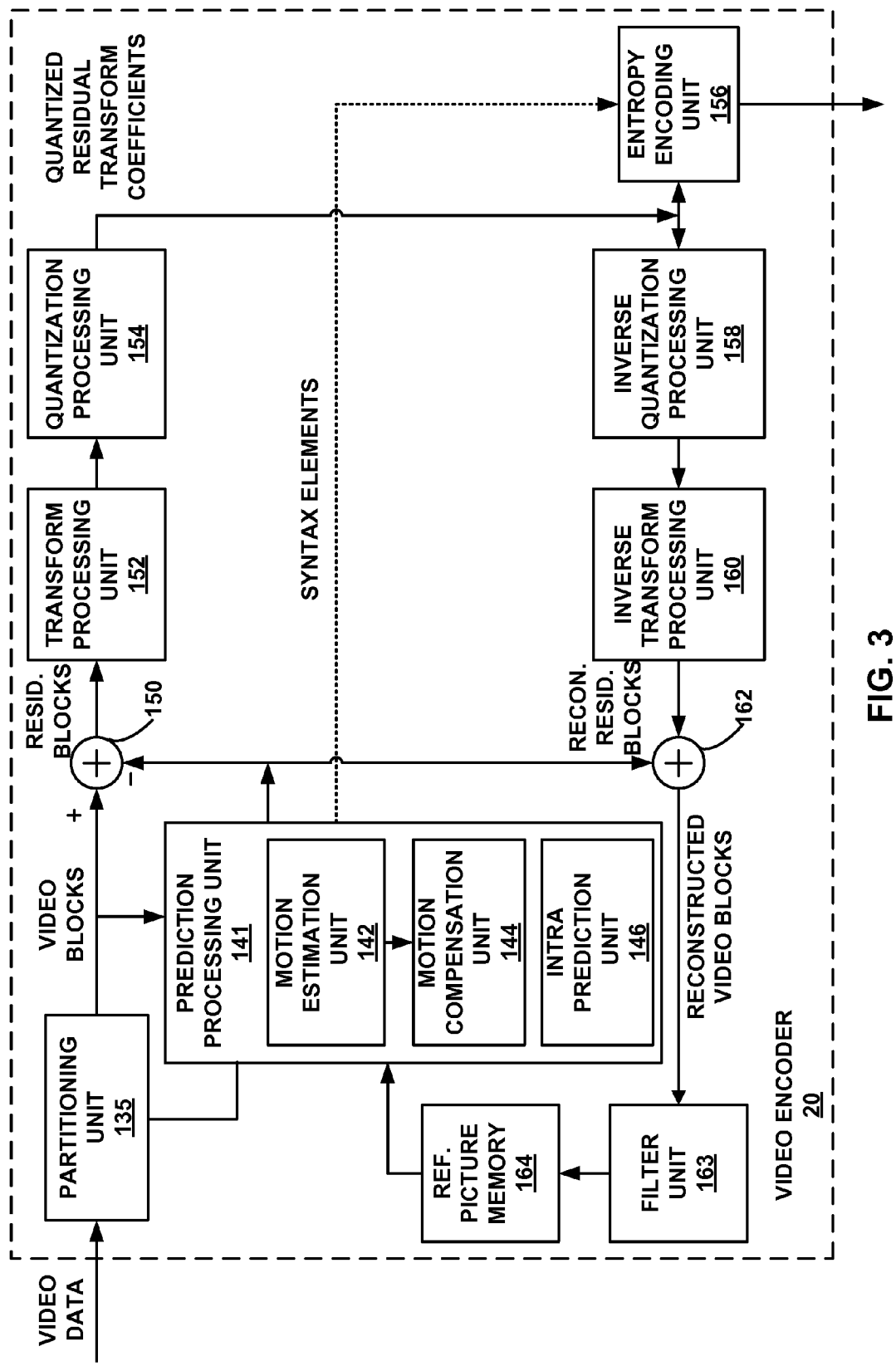
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding (intra-prediction encoding or decoding and inter-prediction encoding or decoding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 135, prediction processing unit 141, filter unit 163, reference picture memory 164 (sometimes referred to as a decoded picture buffer), summer 150, transform processing unit 152, quantization processing unit 154, and entropy encoding unit 156. Prediction processing unit 141 includes motion estimation unit 142, motion compensation unit 144, and intra prediction unit 146. For video block reconstruction, video encoder 20 also includes inverse quantization processing unit 158, inverse transform processing unit 160, and summer 162. Filter unit 163 may generally represent one or more loop filters such as a deblocking filter, an adaptive loop filter (ALF), and a sample adaptive offset (SAO) filter. Although filter unit 163 is shown in FIG. 3 as being an in loop filter, in other configurations, filter unit 163 may be implemented as a post loop filter, in which case unfiltered data may be used in the coding loop.

As shown in FIG. 3, video encoder 20 receives video data, and partitioning unit 135 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra prediction unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices, B slices or GPB slices. Motion estimation unit 142 and motion compensation unit 144 may be highly integrated, but are illustrated separately for conceptual purposes. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. For example, video encoder 20 may interpolate values of one-quarter pixel positions, one-eighth pixel positions, or other fractional pixel positions of the reference picture. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 164. Motion estimation unit 142 sends the calculated motion vector to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

Intra-prediction unit 146 may intra-predict a current block, as an alternative to the inter-prediction performed by motion estimation unit 142 and motion compensation unit 144, as described above. In particular, intra-prediction unit 146 may determine an intra-prediction mode to use to encode a current block. In some examples, intra-prediction unit 146 may encode a current block using various intra-prediction modes, e.g., during separate encoding passes, and intra-prediction unit 146 (or a mode select unit (not illustrated), in some examples) may select an appropriate intra-prediction mode to use from the tested modes. For example, intra-prediction unit 146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 146 may calculate ratios from the distortions and rates for the various encoded blocks to determine which intra-prediction mode exhibits the best rate-distortion value for the block.

In any case, after selecting an intra-prediction mode for a block, intra-prediction unit 146 may provide information indicative of the selected intra-prediction mode for the block to entropy encoding unit 156. Entropy encoding unit 156 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 141 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization processing unit 154. Quantization processing unit 154 quantizes the transform coefficients to further reduce bit rate. The quantization process may reduce the bit depth associated with some or all of the coefficients. The degree of quantization may be modified by adjusting a quantization parameter. In some examples, quantization processing unit 154 may then perform a scan of the matrix including the quantized transform coefficients. Alternatively, entropy encoding unit 156 may perform the scan.

Following quantization, entropy encoding unit 156 entropy encodes the quantized transform coefficients. For example, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors and the other syntax elements for the current video slice being coded.

Inverse quantization processing unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 adds the reconstructed residual block to the motion compensated prediction block produced by motion compensation unit 144 to produce a reference block for storage in reference picture memory 164. The reference block may be used by motion estimation unit 142 and motion compensation unit 144 as a reference block to inter-predict a block in a subsequent video frame or picture.

Video encoder 20 of FIG. 3 represents an example of a video encoder configured to implement on or more of the techniques described herein. For example, prediction processing unit 141 represents one example unit for performing the example functions described above. Prediction processing unit 141 may generate the NAL units and associate the NAL units to the decoding units of an access unit. Prediction processing unit 141 may generate the decoding unit identifiers and include the decoding unit identifiers in decoding unit information SEI message of an SEI NAL unit and/or include the decoding unit identifiers in slice headers of slices of slice NAL units. Entropy encoding unit 156 may entropy encode the decoding units (e.g., the NAL units within the decoding units).

In some examples, a different unit than prediction processing unit 141 may implement the examples described above. In some examples, prediction processing unit 141 in conjunction with one or more other units of video encoder 20 may implement the examples described above. In some examples, a processor or unit of video encoder 20 (not shown in FIG. 3) may, alone or in conjunction with other units of video encoder 20, implement the examples described above.

Figure 4:
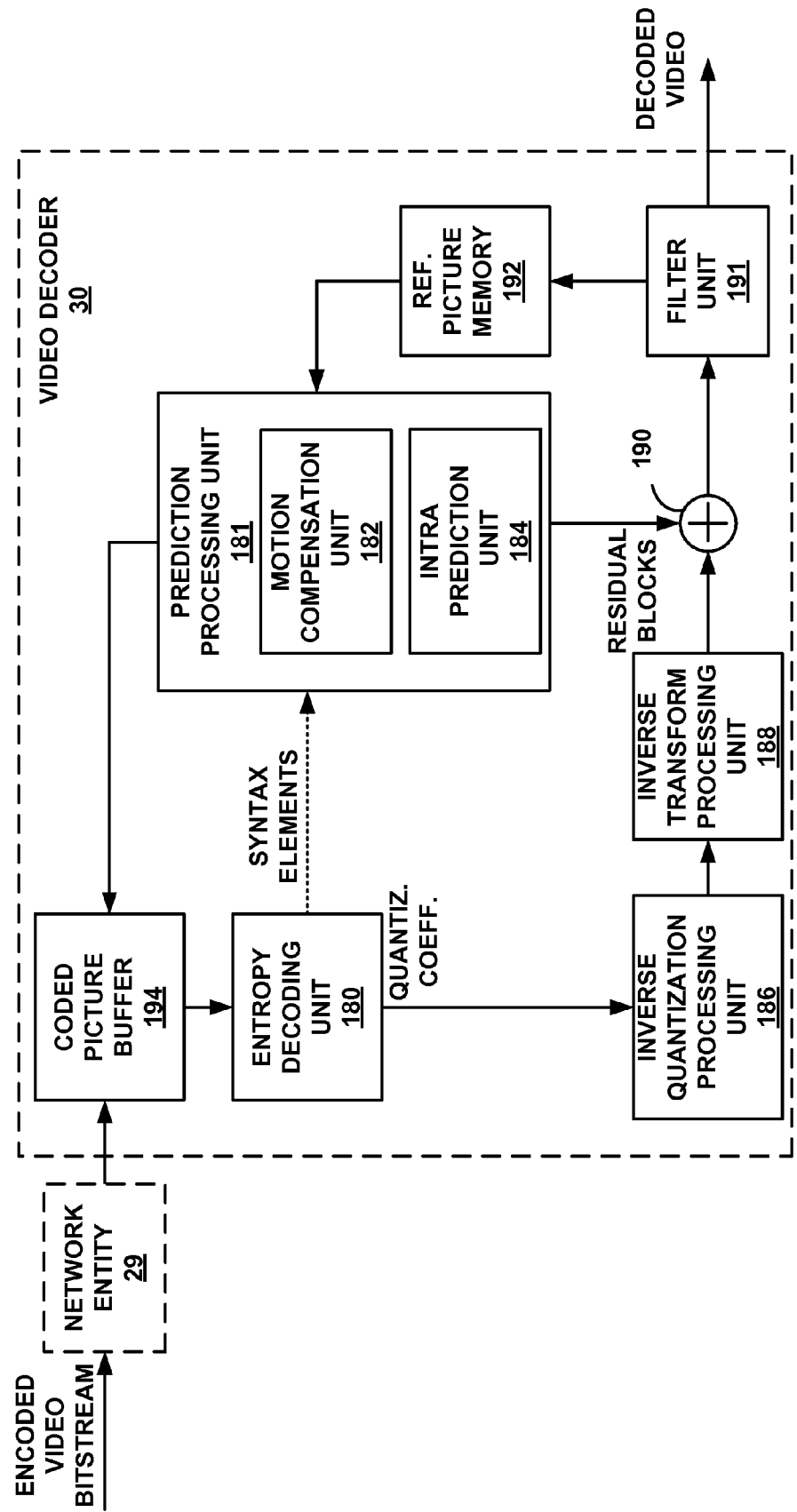
FIG. 4 is a block diagram illustrating an example video decoder that may implement the techniques described in this disclosure.

FIG. 4 is a block diagram illustrating an example video decoder 30 that may implement the techniques of this disclosure. In the example of FIG. 4, video decoder 30 includes an entropy decoding unit 180, prediction processing unit 181, inverse quantization processing unit 186, inverse transform processing unit 188, summer 190, filter unit 191, reference picture memory 192 (sometimes referred to as a decoding picture buffer (DBP)), and coded picture buffer (CPB) 194. Prediction processing unit 181 includes motion compensation unit 182 and intra prediction unit 184. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. As described above, some of the techniques described in this disclosure may be implemented by network entity 29 prior to network 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Coded picture buffer 194 receives the coded pictures from network entity 29. As described in this disclosure, part of the syntax elements in the encoded bitstream indicate whether sub-picture level access to CPB 194 is allowed. Also, the encoded bitstream may include SEI messages that define information for processing of the pictures within CPB 194 (e.g., removal times of decoding units of an access unit).

Entropy decoding unit 180 of video decoder 30 entropy decodes the bitstream to generate quantized coefficients, motion vectors, and other syntax elements. Entropy decoding unit 180 forwards the motion vectors and other syntax elements to prediction processing unit 181. Video decoder 30 may receive the syntax elements at the video slice level and/or the video block level.

When the video slice is coded as an intra-coded (I) slice, intra prediction unit 184 of prediction processing unit 181 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference frame (picture) lists, List 0 and List 1, using default construction techniques based on reference pictures stored in reference picture memory 192.

Motion compensation unit 182 determines prediction information for a video block of the current video slice by parsing the motion vectors and other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and use the interpolation filters to produce predictive blocks.

Inverse quantization processing unit 186 inverse quantizes, i.e., de-quantizes, the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform, e.g., an inverse DCT, an inverse integer transform, or a conceptually similar inverse transform process, to the transform coefficients in order to produce residual blocks in the pixel domain.

After motion compensation unit 182 generates the predictive block for the current video block based on the motion vectors and other syntax elements, video decoder 30 forms a decoded video block by summing the residual blocks from inverse transform processing unit 188 with the corresponding predictive blocks generated by motion compensation unit 182. Summer 190 represents the component or components that perform this summation operation. If desired, loop filters (either in the coding loop or after the coding loop) may also be used to smooth pixel transitions, or otherwise improve the video quality. Filter unit 191 may represent one or more loop filters such as a deblocking filter, an adaptive loop filter (ALF), and a sample adaptive offset (SAO) filter. Although filter unit 191 is shown in FIG. 4 as being an in loop filter, in other configurations, filter unit 191 may be implemented as a post loop filter. The decoded video blocks in a given frame or picture are then stored in reference picture memory 192, which stores reference pictures used for subsequent motion compensation. Reference picture memory 192 also stores decoded video for later presentation on a display device, such as display device 31 of FIG. 1.

Video decoder 30 of FIG. 4 represents an example of a video decoder configured to implement on or more of the techniques described herein. For example, prediction processing unit 181 represents one example unit for performing the example functions described above. For example, prediction processing unit 181 may determine whether the SubPicCpbFlag indicates that sub-picture level operation in CPB 194 is allowed. If sub-picture level operation is allowed, prediction processing unit 181 may determine which NAL units are associated with which decoding units of an access unit.

For example, prediction processing unit 181 may determine that an SEI NAL unit includes the decoding unit information SEI message. From the decoding unit information SEI message, prediction processing unit 181 may determine the removal time from CPB 194 of the decoding unit, and the decoding unit identifier. Prediction processing unit 181 may determine that the SEI NAL unit and all NAL units that follow the SEI NAL unit until another SEI NAL unit that includes a decoding unit information SEI message with a different decoding unit identifier are associated with the decoding unit identified by the decoding unit information SEI message of the decoding unit.

As another example, prediction processing unit 181 may determine that a slice of a slice header includes a decoding unit identifier. Prediction processing unit 181 may determine to which decoding unit the slice NAL unit that includes the slice and its slice header is associated based on the decoding identifier.

In this manner, even if a NAL unit is lost in transmission, prediction processing unit 181 may be able to determine to which decoding units the other (i.e., received and not lost) NAL units are associated. In some examples, prediction processing unit 181 may be capable of determining the time when the decoding unit is to be removed from CPB 194 because there may be multiple copies of the decoding unit SEI message within the decoding unit.

In some examples, a different unit than prediction processing unit 181 may implement the examples described above. In some examples, prediction processing unit 181 in conjunction with one or more other units of video decoder 30 may implement the examples described above. In some examples, a processor or unit of video decoder 30 (not shown in FIG. 4) may, alone or in conjunction with other units of video decoder 30, implement the examples described above.

Figure 5:
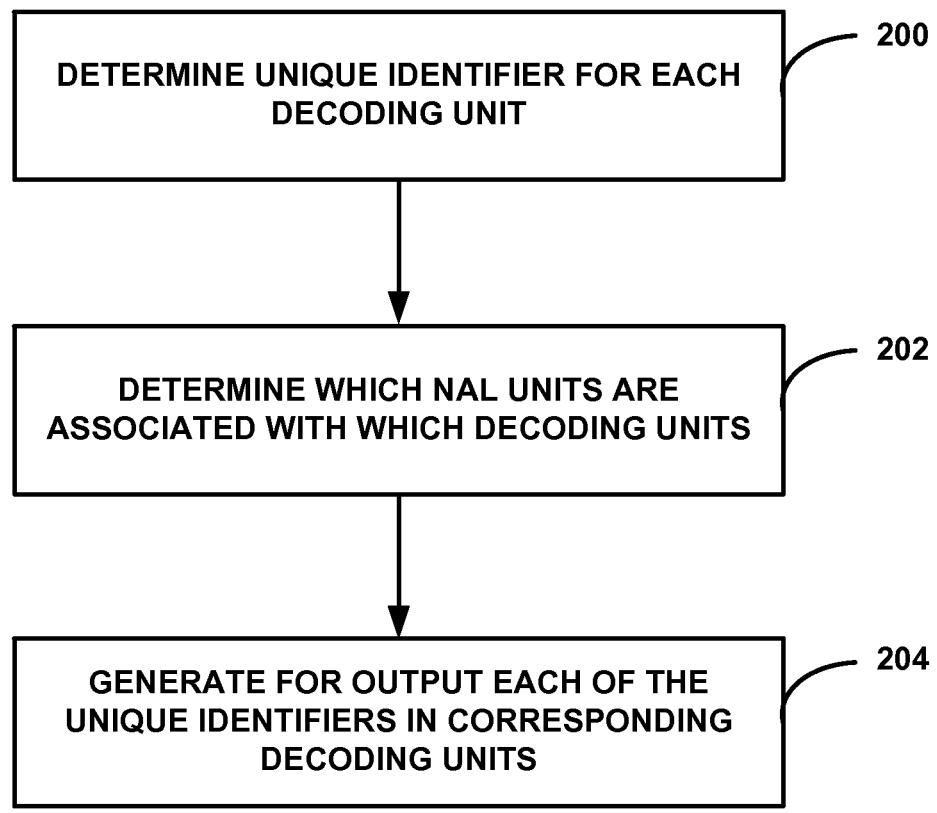
FIG. 5 is a flowchart illustrating an example of encoding video data in accordance with one or more examples described in this disclosure.

FIG. 5 is a flowchart illustrating an example of encoding video data in accordance with one or more examples described in this disclosure. For purposes of illustration, the example of FIG. 5 is described with respect to video encoder 20.

Video encoder 20 determines a unique identifier for each decoding unit in access unit (200). An identifier for one decoding unit is different than an identifier for any other decoding unit in the access unit. For example, video encoder 20 determines a first identifier for a first decoding unit in the access units, and determines a second, different identifier for a second, different decoding unit in the access unit. In this example, if the value of the first identifier is less than the value of the second identifier, the first decoding unit precedes the second decoding unit in decoding order.

Video encoder 20 determines which NAL units are associated with which decoding units (202) of the access unit. For example, decoding unit may each represent video data for part of a picture, and the NAL units may represent part of the decoding unit. Video encoder 20 may determine which parts of the video data of the decoding unit are represented by which NAL units and determine that the NAL units that represent the video data of the decoding unit are associated with the decoding unit.

Video encoder 20 generate for output each unique identifier in corresponding decoding units to indicate which NAL units are associated with which decoding units of the access unit (204). For instance, video encoder 20 may entropy encode the unique identifiers for each of the decoding units via entropy encoding unit 156. In these examples, the encoding may be considered as generating for output. Moreover, video encoder 20 may output (e.g., signal) each unique identifier in corresponding decoding units to indicate which NAL units are associated with which decoding units of the access units as part of a coded bitstream.

For example, video encoder 20 may include a first unique identifier for a first decoding unit in a first decoding unit information SEI message, and output all NAL units that are associated with the first decoding unit after the outputting of the first unique identifier as part of the first decoding unit information SEI message. Video encoder 20 may include a second decoding unit identifier for a second decoding unit in a second decoding unit SEI message. After the outputting of all NAL units that are associated with the first decoding unit, video encoder 20 may output the second decoding unit identifier in the second decoding unit SEI message as part of the outputting of second decoding unit. As another example, video encoder 20 may include and output each of the unique identifiers in slice headers of slice NAL units.

In some examples, video encoder 20 may output, as part of a decoding unit, a first decoding unit SEI message that indicates information for a removal time of the decoding unit. Video encoder 20 may also output, as part of the decoding unit, a second decoding unit SEI message that indicates information for the removal time of the decoding unit. In some cases, the second decoding unit SEI message is a copy of the first decoding unit SEI message. In some examples, video encoder 20 may include an SEI message in the access unit, and include a copy of the SEI message in the access unit. Video encoder 20 may output the access unit that includes the SEI message and the copy of the SEI message.

Figure 6:
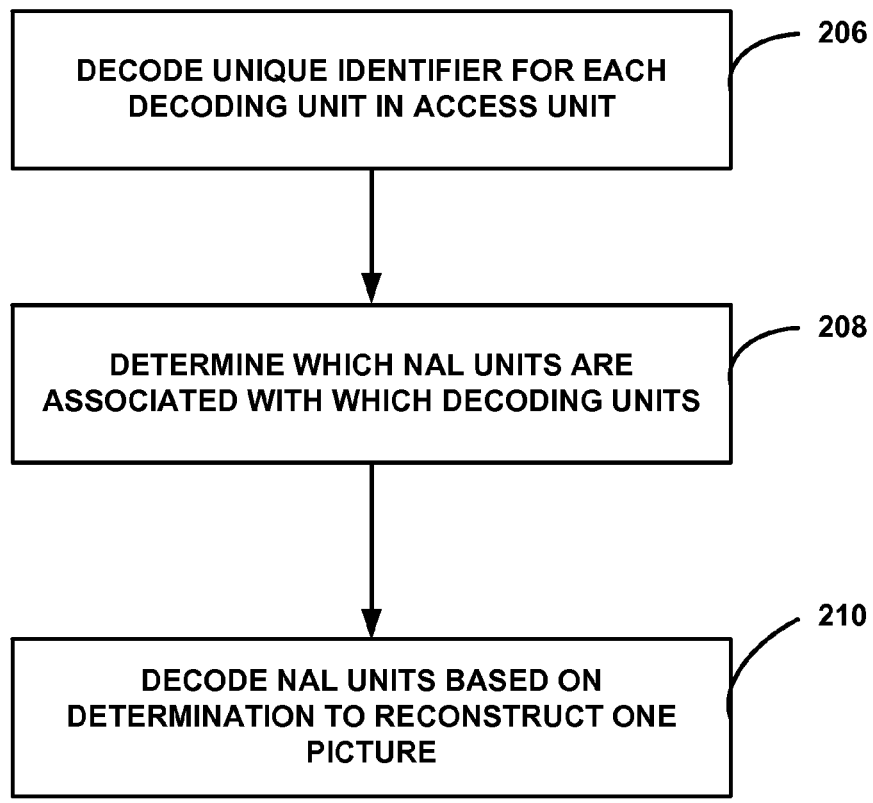
FIG. 6 is a flowchart illustrating an example of decoding video data in accordance with one or more examples described in this disclosure.

FIG. 6 is a flowchart illustrating an example of decoding video data in accordance with one or more examples described in this disclosure. For purposes of illustration, the example of FIG. 6 is described with respect to video decoder 30.

Video decoder 30 may decode unique identifier for each decoding unit in access unit (206). In this example, an identifier for one decoding unit is different than an identifier for any other decoding unit in the access unit. For example, video decoder 30 may decode a first identifier for a first decoding unit in the access unit, and decode a second, different identifier for a second, different decoding unit in the access unit. In this example, if a value of the first identifier is less than a value of the second identifier, the first decoding unit precedes the second decoding unit in decoding order.

Video decoder 30 may determine which NAL units are associated with which decoding units based on the unique identifier for each decoding unit in the access unit (208). For example, video decoder 30 may decode a first unique identifier from a first decoding unit information SEI message for a first decoding unit and decode a second unique identifier from a second decoding unit SEI message for a second decoding unit. Video decoder 30 may determine that a first SEI NAL unit that includes the first decoding unit information SEI message and all NAL units that follow the first SEI NAL unit up to a second SEI NLA unit that includes the second decoding unit information SEI message are associated with the first decoding unit. As another example, video decoder 30 may decode the unique identifier in a slice header of a slice NAL unit, and determine which decoding unit the slice NAL unit is associated with based on the unique identifier in the slice header.

Video decoder 30 may decode NAL units based on the determination to reconstruct at least one picture (210). For example, the result of decoding all of the NAL units associated with all of the decoding units may be the decoded access unit. As described above, the decoding of an access unit results in at least one picture (e.g., one picture when multiview video coding is not used and multiple pictures when multiview video coding is used).

In some examples, video decoder 30 may decode a first decoding unit information SEI message that indicates information for a removal time of a decoding unit. Video decoder 30 may also decode a second decoding unit information SEI message that is located between two NAL units associated with the decoding unit. In this example, the second decoding unit information SEI message is a copy of the first decoding unit information SEI message. In some examples, video decoder 30 may decode an SEI message in the access unit and decode a copy of the SEI message in the access unit.

Figure 7:
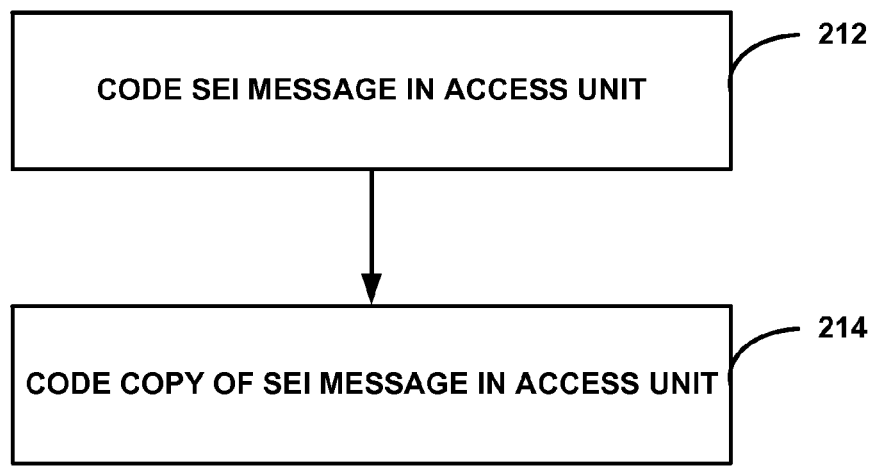
FIG. 7 is a flowchart illustrating an example of coding video data in accordance with one or more examples described in this disclosure.

FIG. 7 is a flowchart illustrating an example of coding video data in accordance with one or more examples described in this disclosure. For purposes of illustration, the techniques are described with respect to a video coder. Examples of the video coder include video encoder 20 and video decoder 30. For instance, when video encoding, the example of the video coder is video encoder 20. When video decoding, the example of the video coder is video decoder 30.

As illustrated in FIG. 7, a video coder is configured to code a supplemental enhancement information (SEI) message in an access unit (212). As described above, the access unit includes the video data for reconstructing at least one picture, and the SEI message defines a characteristic of the video data (e.g., characteristics such as those described above in Tables 1 and 5). In some examples, the video coder may code the SEI message in the access unit for a multi-session transmission. The video coder is configured to code a copy of the SEI message in the access unit (214). In some examples, the video coder may code the copy of the SEI message in the access unit for the multi-session transmission.

For example, video encoder 20 may include the SEI message before a first video coding layer (VCL) network abstraction layer (NAL) unit in decoding order in the access unit. Video encoder 20 may include the copy of the SEI message after the first VCL NAL unit in decoding order and before a last VCL NAL unit in decoding order. In this example, video encoder 20 may encode the SEI message that is included before the first VCL NAL unit and encode the copy of the SEI message this is included after the first VCL NAL unit and before the last VCL NAL unit.

As another example, video decoder 30 may decode a first VCL NAL unit in decoding order in the access unit and decode a last VCL NAL unit in decoding order in the access unit. In this example, video decoder 30 may decode the SEI message prior to decoding the first VCL NAL unit, and decode the copy of the SEI message after decoding the first VCL NAL unit and prior to decoding the last VCL NAL unit.

In some examples, the video coder may determine a type of the SEI message. The video coder may also determine a temporal identification value of the access unit. The video coder may determine whether a presence of the SEI message is allowed based on the temporal identification value of the access unit and the type of the SEI message. In these examples, the video coder may code the SEI message based on the determination of whether the presence of the SEI message is allowed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

In still other examples, this disclosure contemplates a computer readable medium comprising a data structure stored thereon, wherein the data structure includes comprise encoded bitstream that is coded consistent with this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   decoding, from a bitstream, a first video coding layer (VCL) network abstraction layer (NAL) unit in decoding order in an access unit, wherein the access unit includes the video data for reconstructing at least one picture;
   decoding, from the bitstream, a second VCL NAL unit in decoding order in the access unit;
   decoding, from the bitstream, a supplemental enhancement information (SEI) message of a particular type in the access unit prior to decoding, from the bitstream, the first VCL NAL unit, wherein SEI messages contain information associated with processing of the video data; and
   decoding, from the bitstream, a copy of the SEI message of the particular type in the access unit after decoding, from the bitstream, the first VCL NAL unit and prior to decoding, from the bitstream, the second VCL NAL unit, wherein content of the copy of the SEI message of the particular type in the bitstream is restricted to be identical to content of the decoded SEI message of the particular type.

2. The method of claim 1, further comprising:
   determining the particular type of the SEI message;
   determining a temporal identification value of the access unit; and
   determining whether a presence of the SEI message is allowed based on the temporal identification value of the access unit and the particular type of the SEI message,
   wherein decoding the SEI message comprises decoding the SEI message based on the determination of whether the presence of the SEI message is allowed.

3. The method of claim 1, wherein the particular type of the SEI message comprises one of:
   a buffering period SEI message;
   a picture timing SEI message;
   a pan-scan rectangle SEI message;
   a filler payload SEI message;
   a user data registered SEI message;
   a user data unregistered SEI message;
   a recovery point SEI message;
   a scene information SEI message;
   a full-frame snapshot SEI message;
   a progressive refinement segment start SEI message;
   a progressive refinement segment end SEI message;
   a film grain characteristics SEI message;
   a deblocking filter display preference SEI message;
   a post-filter hint SEI message;
   a tone mapping information SEI message;
   a frame packing arrangement SEI message;
   a display orientation SEI message;
   a structure of pictures description SEI message;
   a field indication SEI message;
   a decoded picture hash SEI message;
   an active parameter sets SEI message; or
   a sub-picture timing SEI message.

4. The method of claim 1, wherein decoding the SEI message comprises decoding the SEI message in the access unit for a multi-session transmission, and wherein decoding the copy of the SEI message comprises decoding the copy of the SEI message in the access unit for the multi-session transmission.

5. A device for decoding video data, the device comprising:
   a memory unit configured to store the video data; and
   a video decoder configured to:
      decode, from a bitstream, a first video coding layer (VCL) network abstraction layer (NAL) unit in decoding order in an access unit, wherein the access unit includes the video data for reconstructing at least one picture;
      decode, from the bitstream, a second VCL NAL unit in decoding order in the access unit;
      decode, from the bitstream, a supplemental enhancement information (SEI) message of a particular type in the access unit prior to decoding, from the bitstream, the first VCL NAL unit, wherein SEI messages contain information associated with processing of the video data; and
      decode, from the bitstream, a copy of the SEI message of the particular type in the access unit after decoding, from the bitstream, the first VCL NAL unit and prior to decoding, from the bitstream, the second VCL NAL unit, wherein content of the copy of the SEI message of the particular type in the bitstream is restricted to be identical to content of the decoded SEI message of the particular type.

6. The device of claim 5, wherein the video decoder is configured to:
   determine the particular type of the SEI message;
   determine a temporal identification value of the access unit; and
   determine whether a presence of the SEI message is allowed based on the temporal identification value of the access unit and the particular type of the SEI message, and
   wherein the video decoder is configured to decode the SEI message based on the determination of whether the presence of the SEI message is allowed.

7. The device of claim 5, wherein the particular type of SEI message comprises one of:
   a buffering period SEI message;
   a picture timing SEI message;
   a pan-scan rectangle SEI message;
   a filler payload SEI message;
   a user data registered SEI message;
   a user data unregistered SEI message;
   a recovery point SEI message;
   a scene information SEI message;
   a full-frame snapshot SEI message;
   a progressive refinement segment start SEI message;
   a progressive refinement segment end SEI message;
   a film grain characteristics SEI message;
   a deblocking filter display preference SEI message;
   a post-filter hint SEI message;
   a tone mapping information SEI message;
   a frame packing arrangement SEI message;
   a display orientation SEI message;
   a structure of pictures description SEI message;
   a field indication SEI message;
   a decoded picture hash SEI message;
   an active parameter sets SEI message; or
   a sub-picture timing SEI message.

8. The device of claim 5, wherein the video decoder is configured to decode the SEI message in the access unit for a multi-session transmission, and wherein the video decoder is configured to decode the copy of the SEI message in the access unit for the multi-session transmission.

9. The device of claim 5, wherein the device comprises at least one of:
a microprocessor, an integrated circuit, a digital signal processor (DSP), a field programmable gate array (FPGA), a desktop computer, a laptop computer, a tablet computer, a wireless communication device, a phone, a television, a camera, a display device, a digital media player, a video game console, a video game device, or a video streaming device.

10. The device of claim 5, further comprising:
a display configured to display the at least one picture.

11. The device of claim 5, further comprising:
a receiver, wherein the receiver is configured to, via wired communication or wireless communication, receive the video data.

12. A non-transitory computer-readable storage medium having stored computer executable instructions thereon that when executed by one or more processors of a device for decoding video data cause the one or more processors to:
decode, from a bitstream, a first video coding layer (VCL) network abstraction layer (NAL) unit in decoding order in an access unit, wherein the access unit includes the video data for reconstructing at least one picture;
decode, from the bitstream, a second VCL NAL unit in decoding order in the access unit;
decode, from the bitstream, a supplemental enhancement information (SEI) message of a particular type in the access unit prior to decoding, from the bitstream, the first VCL NAL unit, wherein SEI messages contain information associated with processing of the video data; and
decode, from the bitstream, a copy of the SEI message of the particular type in the access unit after decoding, from the bitstream, the first VCL NAL unit and prior to decoding, from the bitstream, the second VCL NAL unit, wherein content of the copy of the SEI message of the particular type in the bitstream is restricted to be identical to content of the decoded SEI message of the particular type.

13. The non-transitory computer-readable storage medium of claim 12, further comprising instructions that cause the one or more processors to:
determine the particular type of the SEI message;
determine a temporal identification value of the access unit; and
determine whether a presence of the SEI message is allowed based on the temporal identification value of the access unit and the type of SEI message, and
wherein the instructions that cause the one or more processors to decode the SEI message comprise instructions that cause the one or more processors to decode the SEI message based on the determination of whether the presence of the SEI message is allowed.

14. The non-transitory computer-readable storage medium of claim 12, wherein the particular type of SEI message comprises one of:
a buffering period SEI message;
a picture timing SEI message;
a pan-scan rectangle SEI message;
a filler payload SEI message;
a user data registered SEI message;
a user data unregistered SEI message;
a recovery point SEI message;
a scene information SEI message;
a full-frame snapshot SEI message;
a progressive refinement segment start SEI message;
a progressive refinement segment end SEI message;
a film grain characteristics SEI message;
a deblocking filter display preference SEI message;
a post-filter hint SEI message;
a tone mapping information SEI message;
a frame packing arrangement SEI message;
a display orientation SEI message;
a structure of pictures description SEI message;
a field indication SEI message;
a decoded picture hash SEI message;
an active parameter sets SEI message; or
a sub-picture timing SEI message.

15. The non-transitory computer-readable storage medium of claim 12, wherein the instructions that cause the one or more processors to decode the SEI message comprise instructions that cause the one or more processors to decode the SEI message in the access unit for a multi-session transmission, and wherein the instructions that cause the one or more processors to decode the copy of the SEI message comprise instructions that cause the one or more processors to decode the copy of the SEI message in the access unit for the multi-session transmission.

16. A device for decoding video data, the device comprising:
means for decoding, from a bitstream, a first video coding layer (VCL) network abstraction layer (NAL) unit in decoding order in an access unit, wherein the access unit includes the video data for reconstructing at least one picture;
means for decoding, from the bitstream, a second VCL NAL unit in decoding order in the access unit;
means for decoding, from the bitstream, a supplemental enhancement information (SEI) message of a particular type in the access unit prior to decoding, from the bitstream, the first VCL NAL unit, wherein SEI messages contain information associated with processing of the video data; and
means for decoding, from the bitstream, a copy of the SEI message of the particular type in the access unit after decoding, from the bitstream, the first VCL NAL unit and prior to decoding, from the bitstream, the second VCL NAL unit, wherein content of the copy of the SEI message of the particular type in the bitstream is restricted to be identical to content of the decoded SEI message of the particular type.

17. A method for encoding video data, the method comprising:
encoding, in an access unit, a supplemental enhancement information (SEI) message of a particular type, wherein the access unit includes the video data for reconstructing at least one picture, and SEI messages contain information associated with processing of the video data;
including the SEI message of the particular type before a first video coding layer (VCL) network abstraction layer (NAL) unit in decoding order in the access unit;
encoding, based on a restriction on content of multiple instances of the SEI message of the particular type within the access unit, a copy of the SEI message of the particular type in the access unit, the restriction being that content of the encoded copy of the SEI message of the particular type be identical to content of the encoded SEI message of the particular type; and
including the copy of the SEI message after the first VCL NAL unit in decoding order and before a second VCL NAL unit in decoding order in the access unit.

18. A device for encoding video data, the device comprising:
a memory unit configured to store the video data; and
a video encoder configured to:
encode, in an access unit, a supplemental enhancement information (SEI) message of a particular type, wherein the access unit includes the video data for reconstructing at least one picture, and SEI messages contain information associated with processing of the video data;
include the SEI message of the particular type before a first video coding layer (VCL) network abstraction layer (NAL) unit in decoding order in the access unit;
encode, based on a restriction on content of multiple instances of the SEI message of the particular type within the access unit, a copy of the SEI message of the particular type in the access unit, the restriction being that content of the encoded copy of the SEI message of the particular type be identical to content of the encoded SEI message of the particular type; and
include the copy of the SEI message after the first VCL NAL unit in decoding order and before a second VCL NAL unit in decoding order in the access unit.

19. The device of claim 18, wherein the device comprises at least one of:
a microprocessor, an integrated circuit, a digital signal processor (DSP), a field programmable gate array (FPGA), a desktop computer, a laptop computer, a tablet computer, a wireless communication device, a phone, a television, a camera, a display device, a digital media player, a video game console, a video game device, or a video streaming device.

20. The device of claim 18, further comprising:
a camera configured to capture the at least one picture.

* * * * *